US011323788B1

(12) United States Patent
Ghuman

(10) Patent No.: US 11,323,788 B1
(45) Date of Patent: May 3, 2022

(54) AMPLIFICATION MODULE

(71) Applicant: Cox Communications, Inc., Atlanta, GA (US)

(72) Inventor: Harjinder S. Ghuman, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 17/175,251

(22) Filed: Feb. 12, 2021

(51) Int. Cl.
*H04Q 11/00* (2006.01)
*H04J 14/02* (2006.01)
*H04B 10/2507* (2013.01)

(52) U.S. Cl.
CPC ..... *H04Q 11/0005* (2013.01); *H04B 10/2507* (2013.01); *H04J 14/0227* (2013.01);
(Continued)

(58) Field of Classification Search
CPC ............... H04J 14/0227–0236; H04Q 11/0005
See application file for complete search history.

(56) References Cited

U.S. PATENT DOCUMENTS 5,663,818 A 9/1997 Yamamoto et al.
5,664,131 A 9/1997 Sugiya
(Continued)

OTHER PUBLICATIONS

Ghuman, H., "Coherent Access Applications for MSOs", SCTE/ISBE, 2018. (23 pages).
(Continued)

*Primary Examiner* — Shi K Li
(74) *Attorney, Agent, or Firm* — Eversheds Sutherland (US) LLP

(57) ABSTRACT

This disclosure describes C and L band optical communications module link extender, and related systems and methods. An example method may include receiving, by a first dense wave division multiplexer (DWDM) of an amplification module in communication with an optical communication module link extender (OCML), first passive optical network (PON) signals in a downstream direction. The example method may also include combining the first PON signals into a combined PON signal, and outputting the combined PON signal to the OCML. The example method may also include receiving, by a first input of the OCML, the combined PON signal. The example method may also include receiving by a second dense wave division multiplexer (DWDM) of the OCML, one or more optical data signals in the downstream direction, the one or more optical data signals being a different signal type than the one or more PON signals. The example method may also include combining, by the second DWDM, the one or more optical data signals into a combined optical data signal, and outputting the combined optical data signal. The example method may also include outputting, by the OCML, the combined optical data signal and the combined PON signal. The example method may also include receiving, from the amplification module and from the OCML, a second combined PON signal in an upstream direction at one or more Raman pumps of the amplification module. The example method may also include outputting, by the one or more Raman pumps, the second combined PON signal to the first DWDM.

20 Claims, 16 Drawing Sheets

(52) U.S. Cl.
CPC .............. *H04Q 2011/0013* (2013.01); *H04Q 2011/0015* (2013.01); *H04Q 2011/0016* (2013.01); *H04Q 2011/0035* (2013.01)

(56) References Cited

U.S. PATENT DOCUMENTS

| | | | |
|---|---|---|---|
| 5,742,416 | A | 4/1998 | Mizrahi |
| 5,995,256 | A | 11/1999 | Fee |
| 5,995,259 | A | 11/1999 | Meli et al. |
| 6,323,994 | B1 | 11/2001 | Li et al. |
| 6,392,790 | B1 | 5/2002 | Lauder et al. |
| 6,414,769 | B1 | 7/2002 | Meli et al. |
| 6,493,133 | B1 | 12/2002 | Liang et al. |
| 6,519,060 | B1 | 2/2003 | Liu |
| 6,570,703 | B2 | 5/2003 | Murakami et al. |
| 6,580,548 | B2 | 6/2003 | Islam |
| 6,606,427 | B1 | 8/2003 | Graves et al. |
| 6,961,522 | B1 | 11/2005 | Castagnetti et al. |
| 6,973,268 | B1 | 12/2005 | Thompson |
| 7,106,969 | B1 | 9/2006 | Lichtman et al. |
| 7,239,772 | B2 | 7/2007 | Wang et al. |
| 7,505,687 | B2 | 3/2009 | Jaggi et al. |
| 7,509,048 | B2 | 3/2009 | Turpin et al. |
| 7,565,081 | B1 | 7/2009 | Britz et al. |
| 7,773,838 | B2 | 8/2010 | Lee et al. |
| 7,796,886 | B2 | 9/2010 | Jaggi et al. |
| 7,805,073 | B2 | 9/2010 | Sabat et al. |
| 8,116,629 | B2 | 2/2012 | Boduch et al. |
| RE43,403 | E | 5/2012 | Jaggi et al. |
| 8,238,751 | B1 | 8/2012 | Iannone et al. |
| 8,320,759 | B2 | 11/2012 | Boduch |
| 8,873,963 | B2 | 10/2014 | Handelman |
| 8,897,639 | B2 | 11/2014 | Trojer et al. |
| 9,014,557 | B2 | 4/2015 | Graves et al. |
| 9,172,492 | B2 | 10/2015 | Lee |
| 10,211,920 | B1 | 2/2019 | Khaleghi et al. |
| 10,541,774 | B1* | 1/2020 | Dai ................. H04B 10/272 |
| 2001/0015843 | A1 | 8/2001 | Miyauchi et al. |
| 2001/0019449 | A1 | 9/2001 | Krummrich |
| 2002/0000346 | A1 | 1/2002 | Baran et al. |
| 2002/0003646 | A1 | 1/2002 | Ishikawa |
| 2002/0024706 | A1 | 2/2002 | Meli |
| 2002/0048066 | A1 | 4/2002 | Antoniades et al. |
| 2002/0089719 | A1 | 7/2002 | Joo et al. |
| 2002/0141046 | A1 | 10/2002 | Joo et al. |
| 2002/0163691 | A1 | 11/2002 | Wong et al. |
| 2002/0181048 | A1 | 12/2002 | Kuykendall et al. |
| 2003/0076560 | A1 | 4/2003 | Pratt et al. |
| 2003/0142978 | A1 | 7/2003 | Lee et al. |
| 2003/0194242 | A1 | 10/2003 | Miyauchi et al. |
| 2004/0184804 | A1 | 9/2004 | Shahar |
| 2004/0252996 | A1 | 12/2004 | McNicol |
| 2005/0141892 | A1 | 6/2005 | Park et al. |
| 2005/0158049 | A1 | 7/2005 | Lee et al. |
| 2005/0286896 | A1 | 12/2005 | Kinoshita et al. |
| 2006/0045528 | A1 | 3/2006 | Gumaste et al. |
| 2006/0104638 | A1 | 5/2006 | Chung et al. |
| 2006/0165412 | A1 | 7/2006 | Jung et al. |
| 2007/0019956 | A1 | 1/2007 | Sorin et al. |
| 2007/0212072 | A1 | 9/2007 | Iannone et al. |
| 2008/0089684 | A1 | 4/2008 | Smith et al. |
| 2009/0010648 | A1 | 1/2009 | Zuhdi et al. |
| 2009/0074417 | A1 | 3/2009 | Vassilieva et al. |
| 2009/0129774 | A1 | 5/2009 | Jaggi et al. |
| 2009/0208212 | A1 | 8/2009 | Lee et al. |
| 2009/0220231 | A1 | 9/2009 | Zimmel et al. |
| 2009/0297152 | A1 | 12/2009 | Bainbridge et al. |
| 2010/0046946 | A1 | 2/2010 | Cao et al. |
| 2010/0054740 | A1 | 3/2010 | Lee et al. |
| 2010/0119223 | A1 | 5/2010 | Ferrari et al. |
| 2010/0189442 | A1 | 7/2010 | Grobe |
| 2010/0239257 | A1 | 9/2010 | Grossman et al. |
| 2010/0266283 | A1 | 10/2010 | Beckett |
| 2010/0278535 | A1 | 11/2010 | Kim |
| 2010/0316386 | A1 | 12/2010 | Luk et al. |
| 2011/0158650 | A1 | 6/2011 | Cavaliere et al. |
| 2011/0299858 | A1 | 12/2011 | Mazzini et al. |
| 2012/0020668 | A1 | 1/2012 | Trojer et al. |
| 2012/0087648 | A1 | 4/2012 | Gao et al. |
| 2012/0148245 | A1 | 6/2012 | Bowler et al. |
| 2012/0315047 | A1 | 12/2012 | Iannone et al. |
| 2013/0039656 | A1 | 2/2013 | Lam et al. |
| 2013/0057948 | A1 | 3/2013 | Simonneau et al. |
| 2013/0084064 | A1 | 4/2013 | Akasaka |
| 2013/0266318 | A1 | 10/2013 | Manaf et al. |
| 2014/0099117 | A1 | 4/2014 | Way |
| 2014/0161446 | A1 | 6/2014 | Lee et al. |
| 2014/0233954 | A1 | 8/2014 | Lee et al. |
| 2015/0043919 | A1 | 2/2015 | Handelman |
| 2015/0139654 | A1 | 5/2015 | Mandelbaum et al. |
| 2015/0249314 | A1 | 9/2015 | Onaka |
| 2015/0249520 | A1 | 9/2015 | Badar et al. |
| 2015/0304033 | A1 | 10/2015 | Girogi et al. |
| 2016/0087747 | A1 | 3/2016 | Way |
| 2016/0192043 | A1 | 6/2016 | Shukunami et al. |
| 2016/0197697 | A1 | 7/2016 | Bonk et al. |
| 2017/0134113 | A1 | 5/2017 | Lam et al. |
| 2017/0237483 | A1 | 8/2017 | Barnard |
| 2017/0272197 | A1* | 9/2017 | Binti Ahmad ....... H04B 10/272 |
| 2018/0212706 | A1 | 7/2018 | Ghuman |
| 2018/0261971 | A1 | 9/2018 | Yaman et al. |
| 2019/0036802 | A1 | 1/2019 | Kuttuva Jeyaram et al. |
| 2019/0037286 | A1* | 1/2019 | Ghuman ............. H04J 14/0291 |
| 2019/0132049 | A1 | 5/2019 | Cai et al. |
| 2019/0140765 | A1 | 5/2019 | Ghuman |
| 2019/0181952 | A1 | 6/2019 | Jia et al. |
| 2019/0215091 | A1 | 7/2019 | Johansson |
| 2020/0099546 | A1 | 3/2020 | Haag et al. |

OTHER PUBLICATIONS

Bindhiaq, et al., "Recent Devlopment on Time and Wavelength-Division Multiplexed Passive Optical Network (TWDM-PON) for Next-Generation Passive Optical Network Stage 2 (NG-PON2)", Optical Switching and Networking 15, 2015. (14 pages).

Ghuman, H., "DWDM Access for Remote PHY Networks Integrated Optical Communications Module (OCML)", 2017 Fall Technical Forum, SCTE-ISBE, NCTA, CABLELABS, 2017. (19 pages).

* cited by examiner

US 11,323,788 B1

AMPLIFICATION MODULE

FIELD OF INVENTION

This disclosure relates generally to the field of optical telecommunications.

BACKGROUND

To understand the importance of optical networking, the capabilities of this technology have to be discussed in the context of the challenges faced by the telecommunications industry, and, in particular, service providers. Most U.S. networks were built using estimates that calculated bandwidth use by employing concentration ratios derived from classical engineering formulas for modeling network usage such as the Poisson process. Consequently, forecasts of the amount of bandwidth capacity needed for data networks were calculated on the presumption that a given individual would only use network bandwidth six minutes of each hour. These formulas did not factor in the amount of traffic generated by different devices accessing the Internet. With the advent of the Internet and the ever increasing number of devices (for example, facsimile machines, multiple phone lines, modems, teleconferencing equipment, mobile devices including smartphones, tablets, laptops, wearable devices, and Internet of Things (IoT) devices, etc.) accessing the Internet, there has been an average increase in Internet traffic of 300 percent year over year. Had these factors been included, a far different estimate would have emerged.

As a result of this growth of devices, a large amount of bandwidth capacity is needed to provide the services required by these devices. In the 1990s, some long-distance carriers increased their capacity (bandwidth) to 1.2 Gbps over a single optical fiber pair, which was a considerable upgrade at the time. At a transmission speed of one Gbps, one thousand books can be transmitted per second. However, today, if one million families in a city decided to view a video on a Website, then network transmission rates on the order of terabits are required. With a transmission rate of one terabit, it is possible to transmit 200 million simultaneous full-duplex phone calls or transmit the text from 300 years-worth of daily newspapers per second.

DETAILED DESCRIPTION

Figure 2:
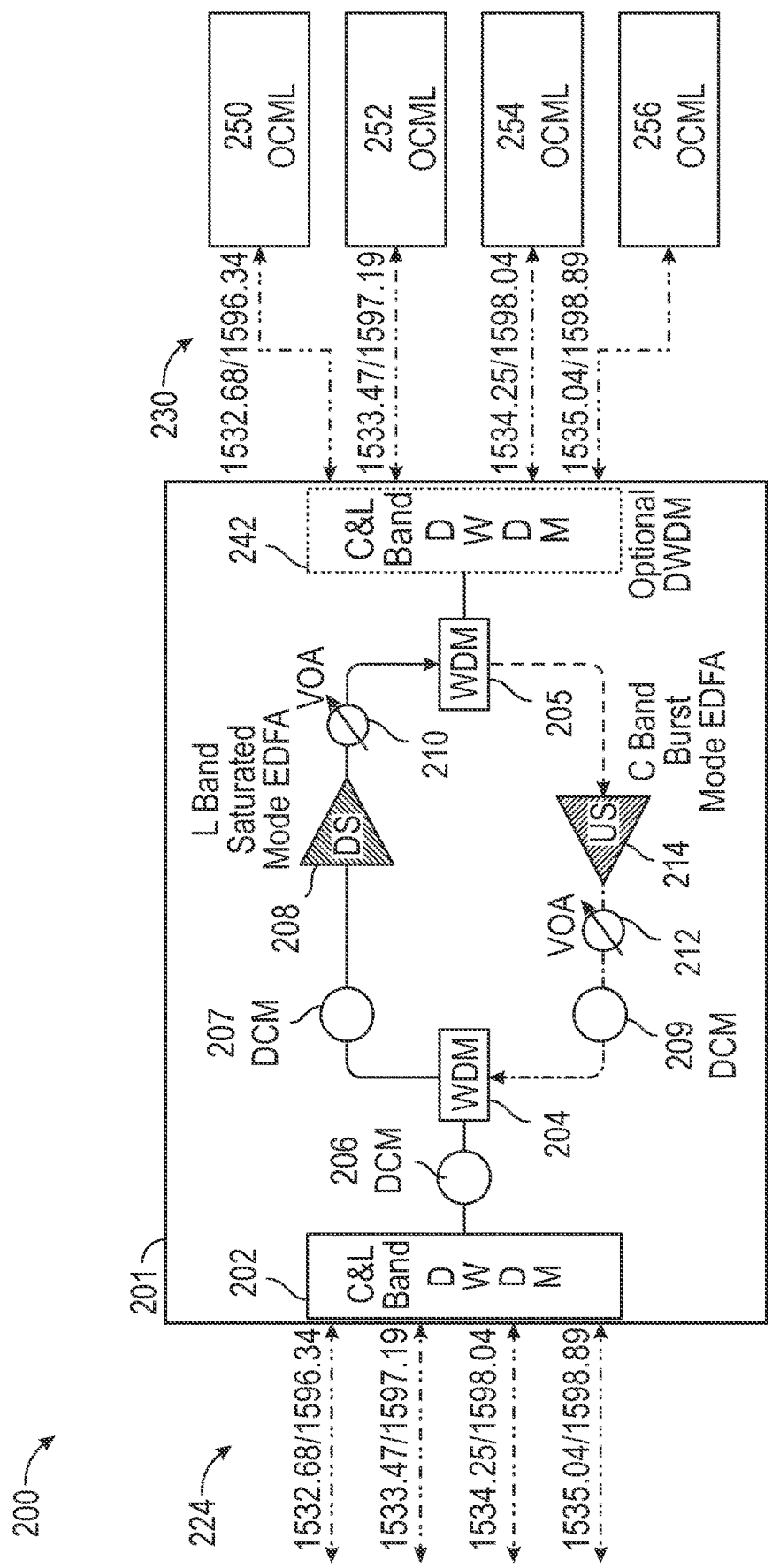
FIG. 2 depicts an example system including amplification module used in conjunction with one or more Optical Communications Module Link (OCML) Extenders, in accordance with the disclosure.
Figure 4:
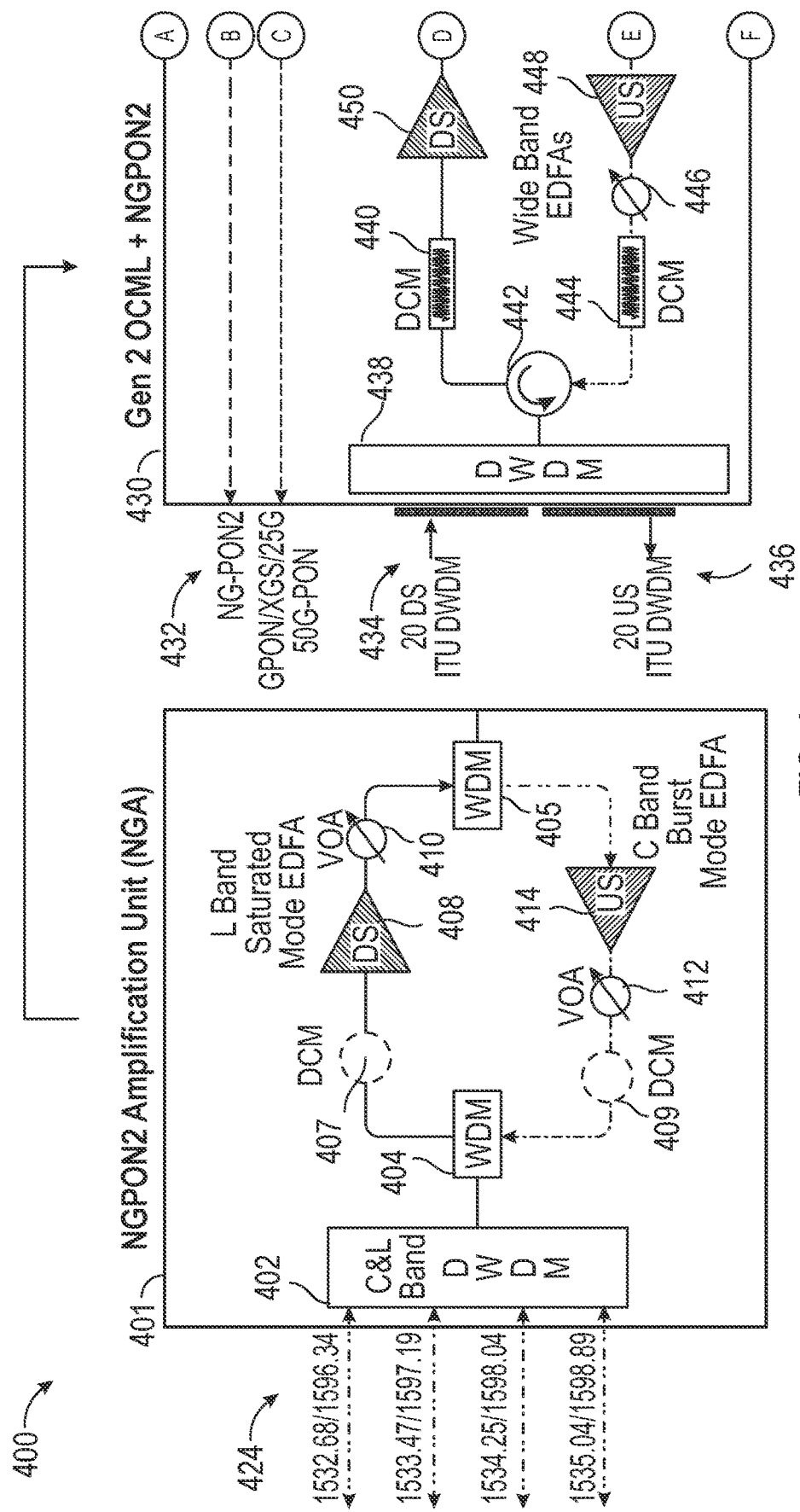
FIG. 4 depicts an amplification module used in conjunction with one or more Optical Communications Module Link (OCML) Extenders, in accordance with the disclosure.
Figure 4:
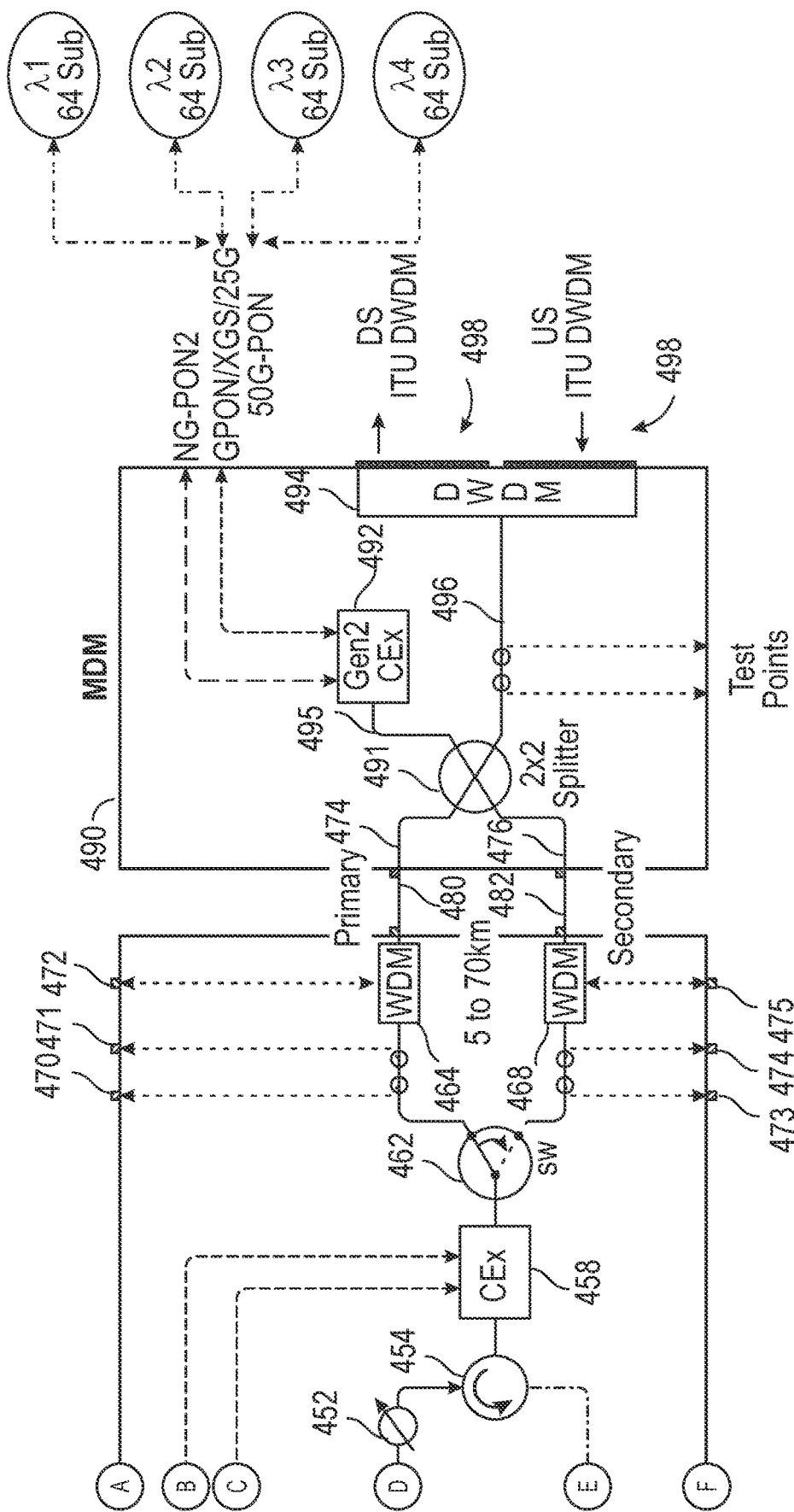
Figure 6:
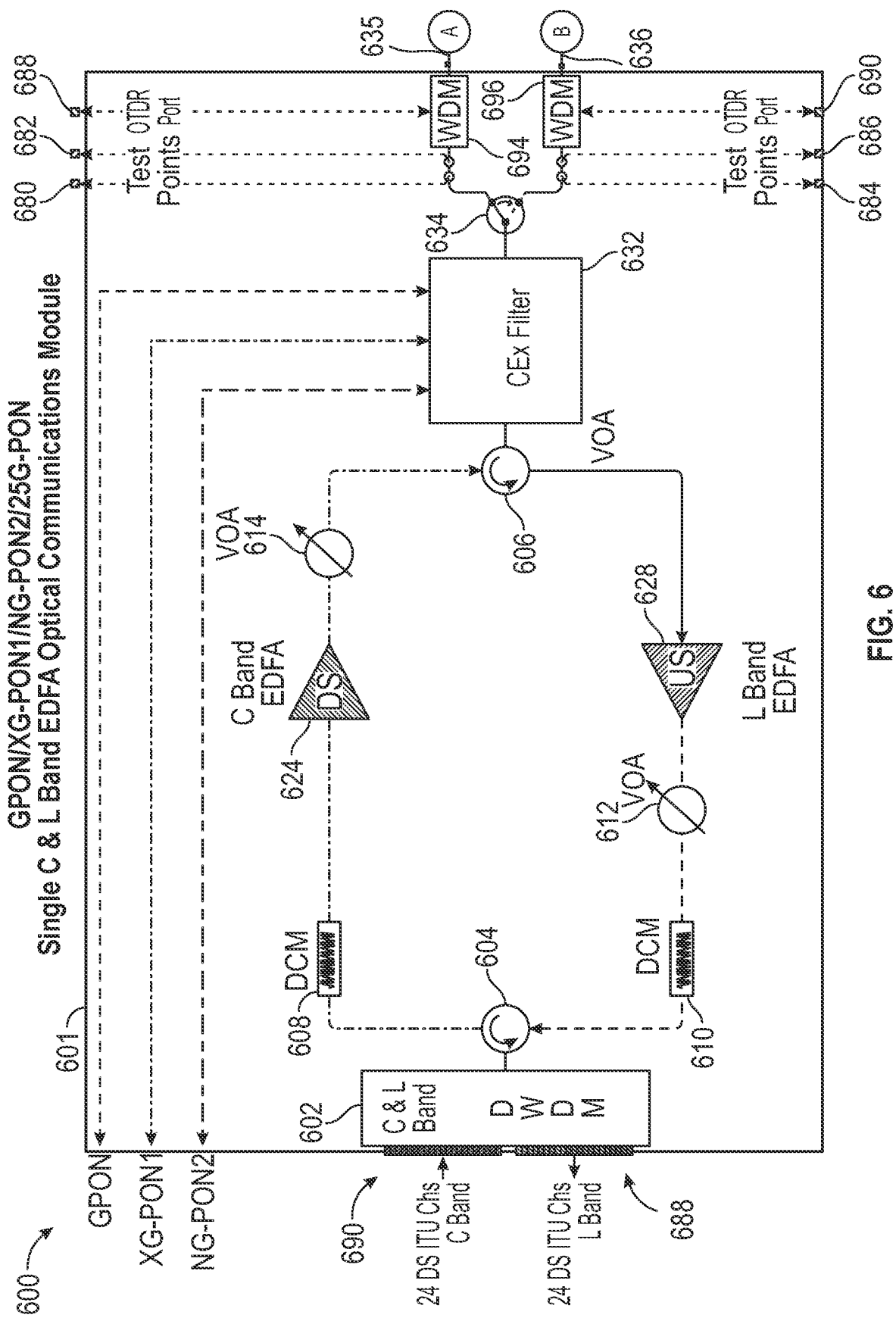
FIG. 6 depicts an alternative embodiment of a multiplexer-demultiplexer (MDM), in accordance with the disclosure.
Figure 6:
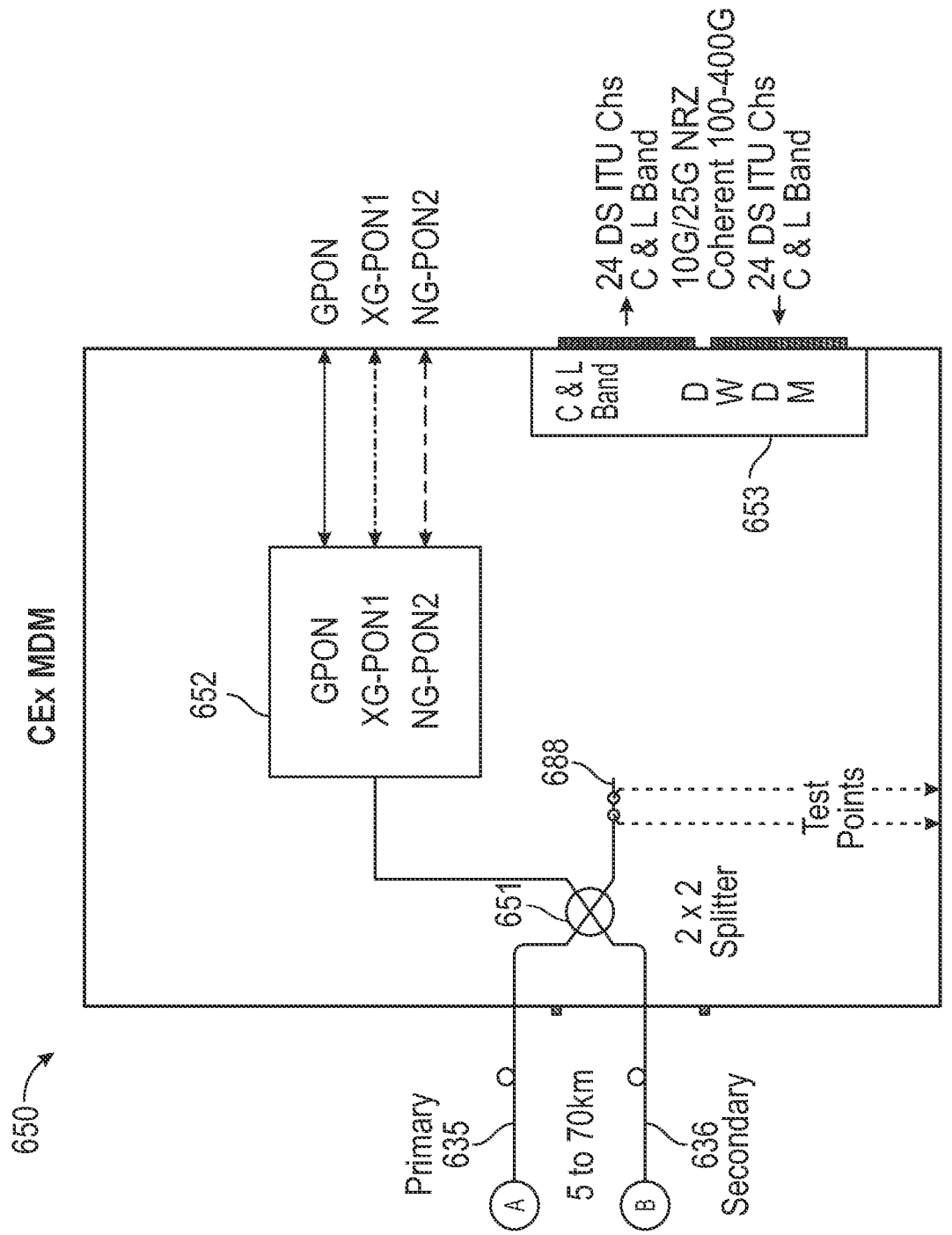
Figure 7:
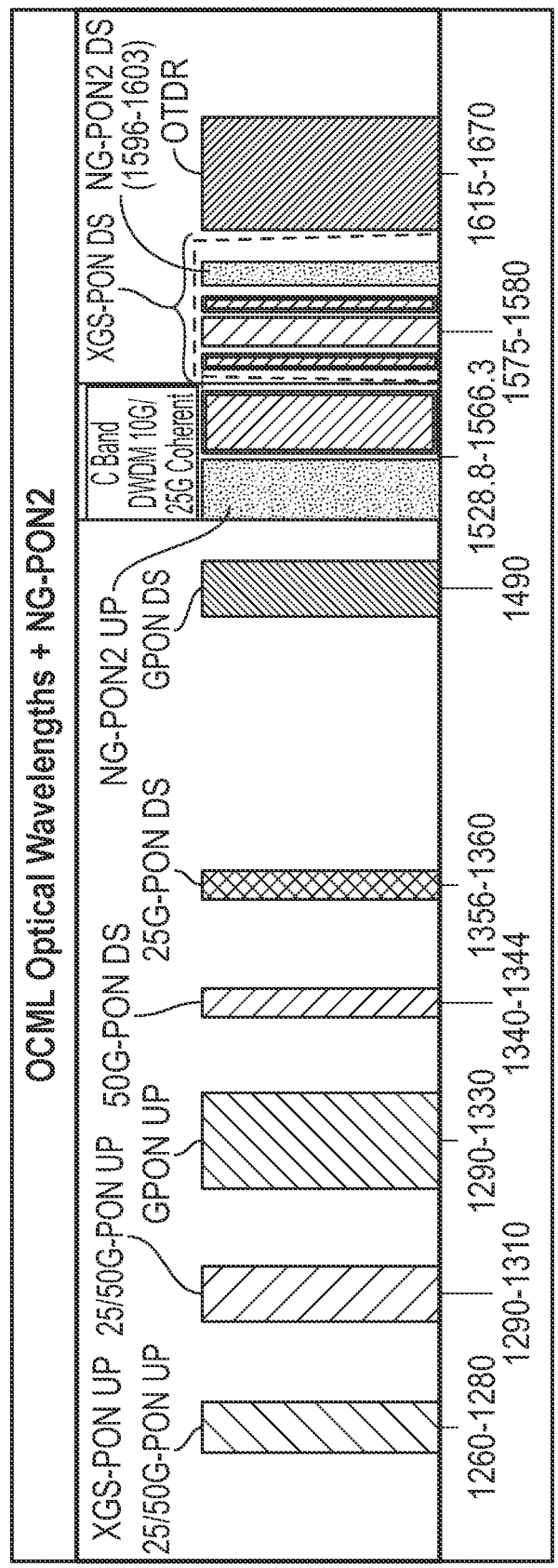
FIG. 7 depicts an example wavelength chart, in accordance with the disclosure.

The disclosure is directed to, among other things, an amplification module. In some embodiments, the amplification module may be a standalone module that may be used in passive optical networks (PON), such as Next-Generation Passive Optical Network 2 (NG-PON2). In some cases, the amplification module may be used in other types of networks as well, such as Gigabit Ethernet PON (GPON), as well as any other type of PON network, or even other types of networks instead of PON networks. In some cases, the amplification module may exist as a standalone device in a network (for example, in a PON network, the amplification module may be provided between an optical line terminal (OLT) placed at a typical central office and one or more customer devices, and may handle downstream and upstream signal transmissions between the OLT and the one or more customer devices). In other cases, the amplification module may be integrated with other devices and/or systems, such as for example, an optical communications module link (OCML) extender as depicted in FIGS. 2, 4, 6, as well as any other OCMLs described herein. Using the amplification module in conjunction with the OCML as mentioned in this example may allow for Ethernet signals to be transmitted on the same fiber as signals being transmitted over the PON network. The amplification module may also be integrated with any other type of device as well.

The use of this amplification module may provide a number of benefits to a network. For example, when implemented in a PON network, the amplification module may allow for greater signal transmissions distances from the OLT to the one or more customer devices located downstream in the network. The amplification module may also allow for more effective upstream burst mode signal transmissions from the customer devices. More specifically, the use of the amplification module as described herein may be beneficial because PON transport may usually be limited to 20 km distances from an OLT. The amplification module, however, allows data transport of up to much larger distances (for example, greater than 50 km). The amplification module may also be beneficial because it may help to mitigate inherent noise problems that may arise in upstream signal transmissions that take place in a PON network. The amplification module may accomplish this by including one or more Raman pumps in the upstream direction. Raman amplification on the upstream PON signals may allow for improvement in the noise limited distance (OSNR).

Figure 1:
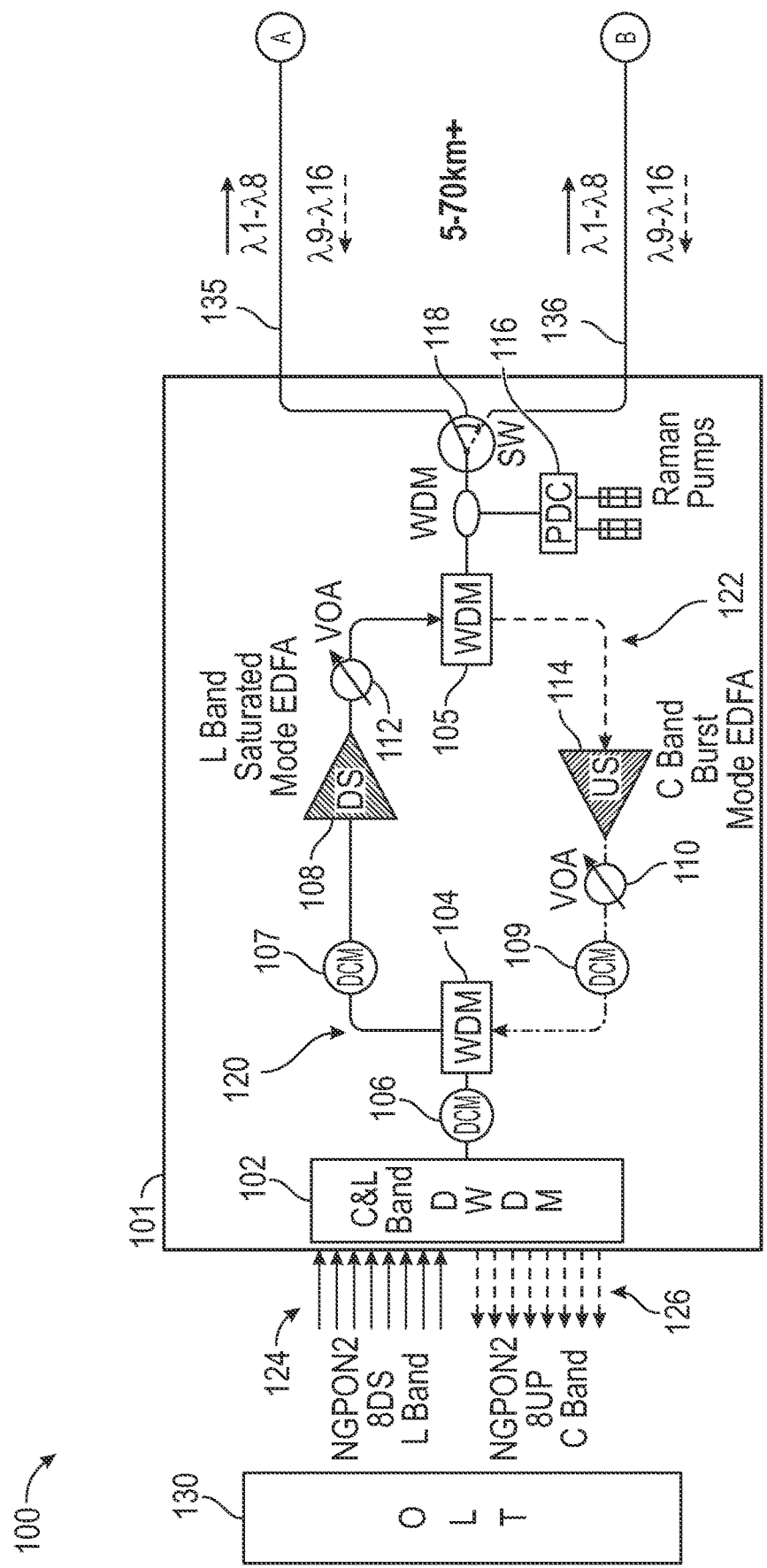
FIG. 1 depicts an example system including an amplification module, in accordance with the disclosure.
Figure 1:
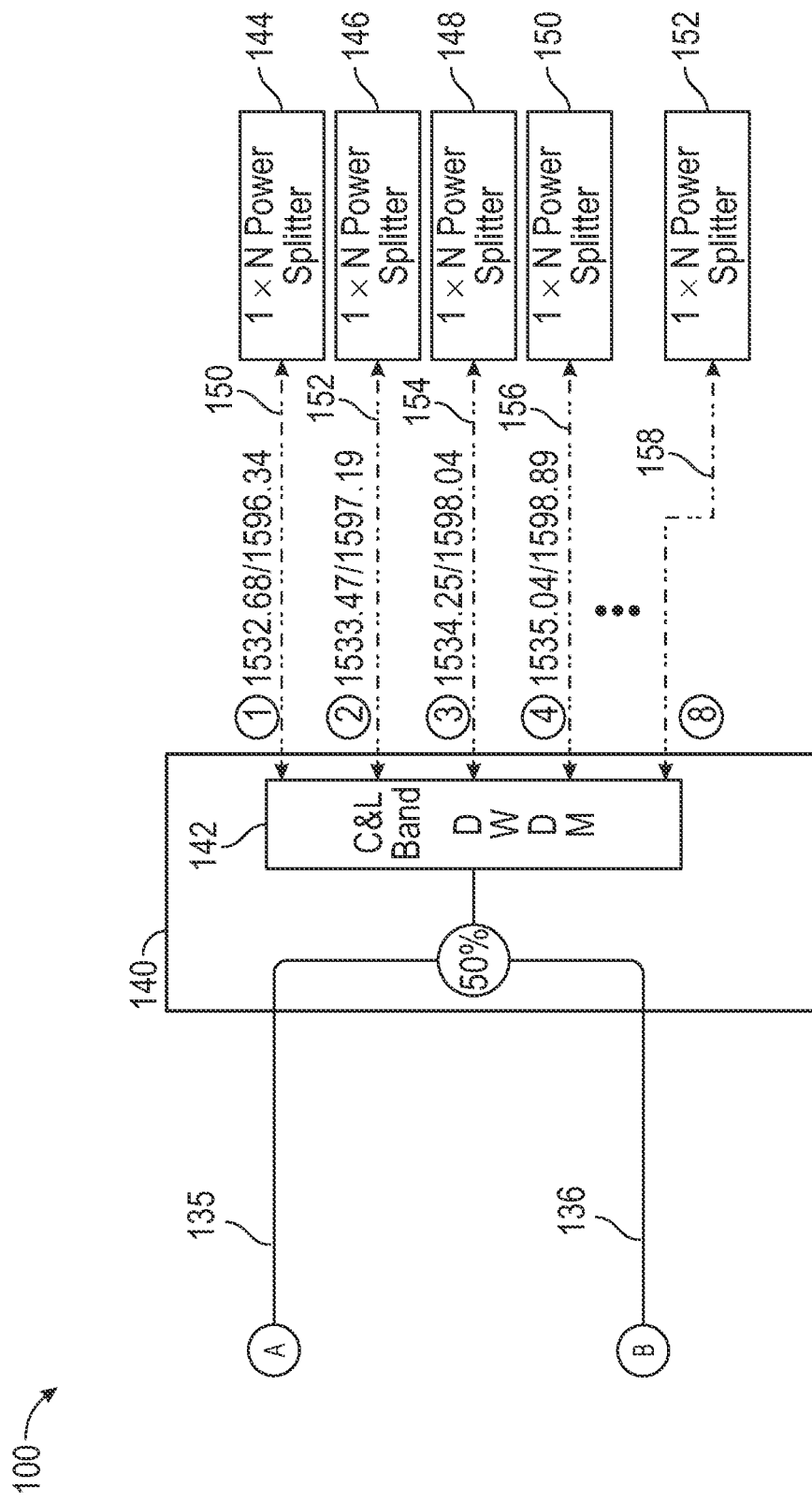

Turning to the figures, FIG. 1 depicts an example system 100 that includes an example amplification module 101. For example, the system 100 may be a PON network, and the amplification module 101 may be used for signal amplification within the PON network. However, the system 100 may alternatively include any other type of network as well (or any number of networks used in combination). Additionally, the amplification module 101 may also be used in conjunction with other devices in other networks as well. For example, the amplification module 201 depicted in FIG. 2 may interface with an OCML 201 that may also handle Ethernet signals (or other types of signals) in addition to the PON signals handled by the amplification module. In some embodiments, the amplification module 101 may include at least one or more dense wave division multiplexers (DWDMs) (for example, DWDM 102), one or more wavelength-division multiplexers (WDMs) (for example, WDM 104 and WDM 105), one or more dispersion compensation modules (DCMs) (for example, DCM 106, DCM 107, and DCM 109), one or more amplifiers (for example, amplifier 108 and amplifier 114), one or more variable optical amplifiers (VOAs) (for example, VOA 110 and VOA 112), one or more Raman pumps (for example, Raman pump 116), and/or one or more optical switches 118. In some embodiments, some of the elements included in the amplification module 101 may be used in downstream 120 signal transmissions (for example, DWDM 102, DCM 106 and/or DCM 107, WDM 104, amplifier 108, VOA 112, WDM 105, and/or optical switch 118), and some elements may be used in upstream 122 signal transmissions (for example, optical switch 118, Raman pump(s) 116, WDM 105, amplifier 114, VOA 10, DCM 106 and/or DCM 109, WDM 104, and/or DWDM 102). The system 100 including the amplification module 101 may further include an OLT 130, a multiplexer/demultiplexer module 140, and one or more power splitters (for example, power splitter 144, power splitter 146, power splitter 148, power splitter 150, and/or power splitter 152).

Figure 3:
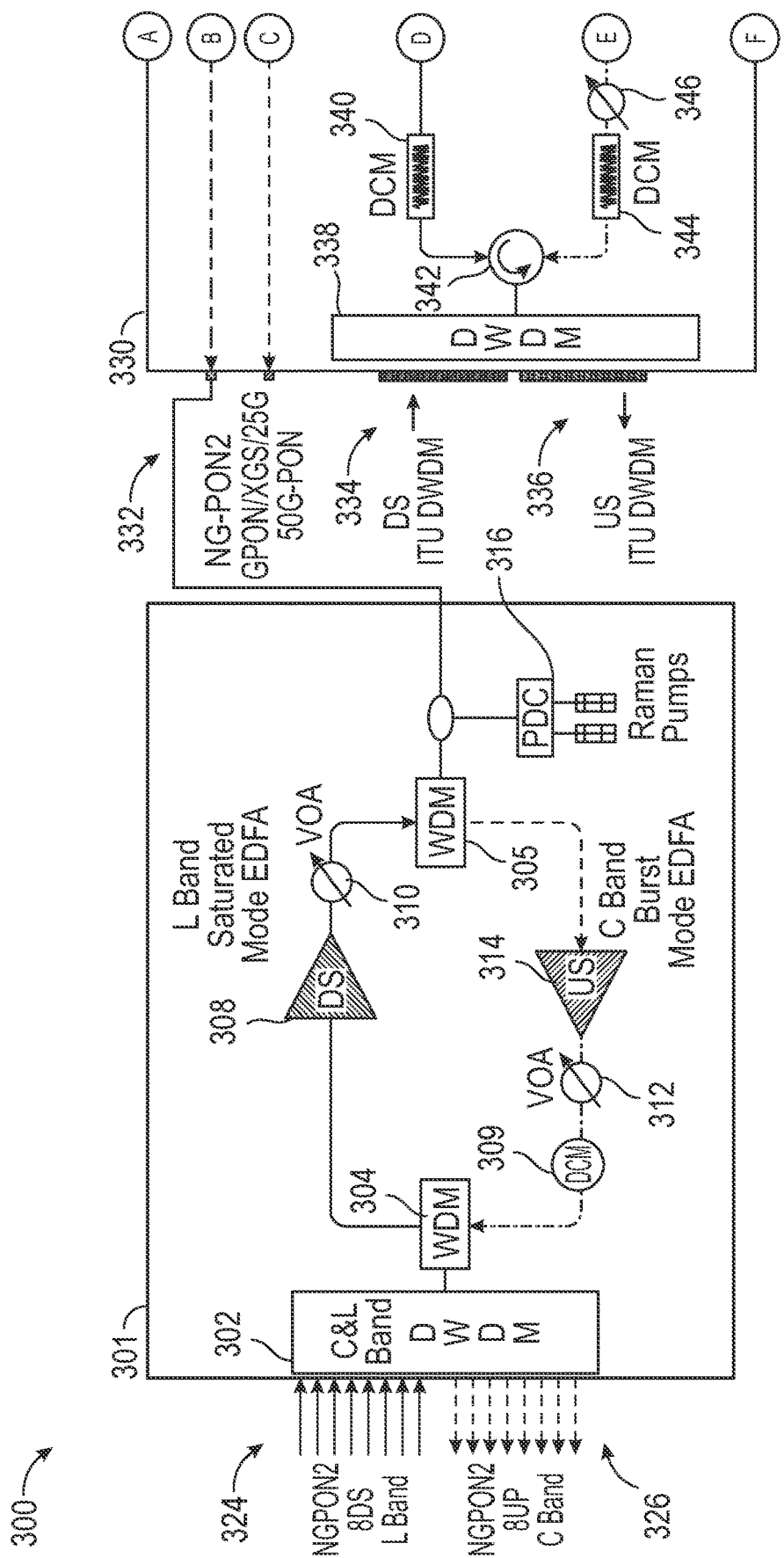
FIG. 3 depicts an amplification module used in conjunction with one or more Optical Communications Module Link (OCML) Extenders, in accordance with the disclosure.
Figure 3:
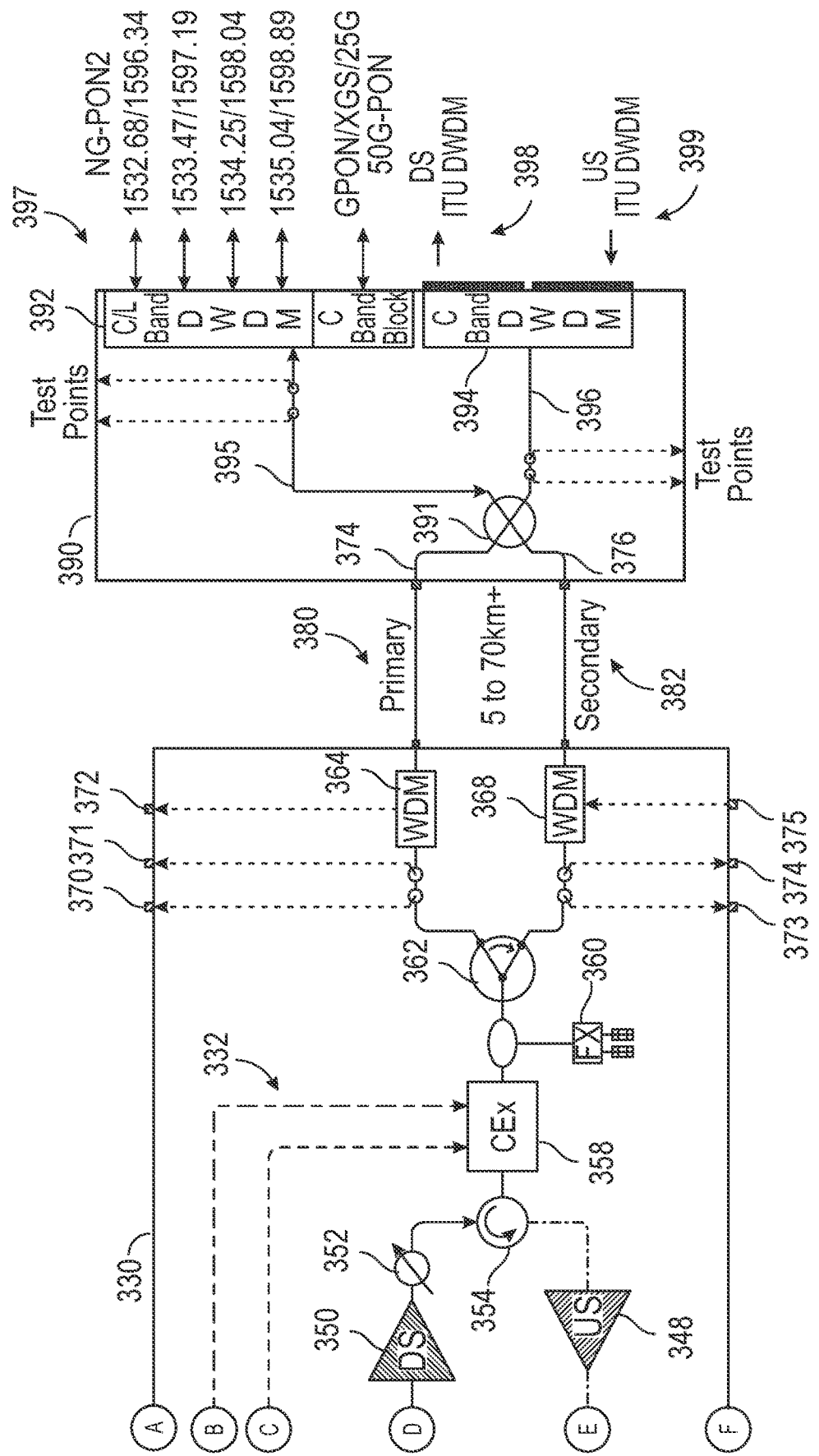

Beginning with signal transmission through the amplification module 100 in the downstream 120 direction, the DWDM 102 may receive one or more input signals 124. The one or more inputs signals 124 may be received from the OLT 130. In some cases, the DWDM 102 may receive the input signals 124 over one or more L band channels (examples of which may be provided in Table 1 presented below), where each channel may be associated with a particular wavelength or a range of wavelengths that may be used for signal transmissions through the channel. However, in some cases, the one or more inputs 124 may also be received over both the L band and the C band, just the C band, or may also be received over any other wavelength as well. The figure may show the inputs 124 as including eight different L band channels, which may include signals of eight different wavelengths or wavelength ranges (however, any other number of inputs may also be used). The wavelengths and/or number of channels that are used may change depending on whether the amplification module 101 is used in conjunction with an OCML (for example, as illustrated in FIGS. 2-4). The DWDM 102 may serve to multiplex the one or more inputs 124 into a multi-wavelength downstream optical data signal. The multi-wavelength downstream optical data signal may have a wavelength range comprising the wavelengths included in the one or more inputs 124. In other words, the multi-wavelength downstream optical data signal may be a signal transmission that may include some or all of the input signals 124 combined as a single signal transmission. The multi-wavelength downstream optical data signal may subsequently be provided from the WDWM 102 to the DCM 106. However, in some embodiments, as mentioned below, the amplification module 106 may not include the DCM 106 and the multi-wavelength downstream optical data signal may be provided directly to the WDM 104 from the DWDM 102.

TABLE 1

| Channel | Central Frequency (THz) | Wavelength (nm) |
|---------|--------------------------|------------------|
| 1 | 187.8 | 1596.34 |
| 2 | 187.7 | 1597.19 |
| 3 | 187.6 | 1598.04 |
| 4 | 187.5 | 1598.89 |
| 5 | 187.4 | 1599.75 |
| 6 | 187.3 | 1600.60 |
| 7 | 187.2 | 1601.46 |
| 8 | 187.1 | 1602.31 |

After being output by the DWDM 102, the multi-wavelength downstream optical data signal may be provided to the DCM 106 to compensate for dispersion that the multi-wavelength downstream optical data signal may experience. In some embodiments, DCM 106 may be configured to balance positive and/or negative dispersion that may be introduced to the egress optical data signal by the fiber. In some embodiments, DCM 106 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 106 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 106 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances. From the DCM 106, the signal may be provided to the WDM 104. In some embodiments any of the DCMs included in the amplification module 101 may be optional. For example, the amplification module 101 may not include the DCM 106, but may rather only include the DCM 107 and/or the DCM 109. In some embodiments, the amplification module 101 may only include the DCM 106. That is, the figure may only depict example locations in which one or more DCMs may be included within the amplification module 101, but the amplification module 101 may not necessarily include all of the depicted DCMs.

The multi-wavelength downstream optical data signal may subsequently be provided to the WDM 104 (from the DWDM 102 or from the DCM 106 depending on the particular embodiment). As is depicted in the figure, signals being transmitted both in the downstream 120 direction and in the upstream 122 direction may pass through the WDM 104. The WDM 104 may serve to combine or separate signals in the downstream L band and the upstream C band (in embodiments in which the downstream includes the L band and the upstream includes the C band).

In some embodiments, the signal output from the WDM 104 (or the DCM 107 in embodiments in which the DCM 107 is included) may be provided to amplifier 108, which may be a wide-band amplifier. More specifically, the amplifier 108 may be an Erbium Doped Fiber Amplifier (EDFA). The amplifier 108 may optimize gain flatness and noise for the broader channel. A gain of the amplifier 108 may be based at least in part on a distance that a downstream signal must travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of amplifier 108 may be adjusted based at least in part on the attenuation coefficient and length of fiber that the egress optical data signal will travel. More specifically, in some instances, the gain of booster optical amplifier 224 may be $G = e^{(2\alpha L)}$, where α is the fiber attenuation coefficient, as explained above, and L is the length of the fiber. The downstream optical data signals received from the WDM 104 (or the DCM 107 in embodiments in which the DCM 107 is included) may be amplified by amplifier 108 and may be provided to VOA 112.

In some embodiments, VOA 112 may receive the amplified downstream optical data signal as an input and may be used to reduce the power levels of the downstream optical data signal. The power reduction may accomplished by absorption, reflection, diffusion, scattering, deflection, diffraction, and dispersion, of the amplified downstream optical data signals. VOA 112 may have a working wavelength range in which it absorbs all light energy equally. In some embodiments, VOA 112 may utilize a length of high-loss optical fiber, that operates upon its input optical signal power level in such a way that its output signal power level is less than the input level. The variability of the output power level of VOA 112 may be achieved using a fiber coupler, where some of the power is not sent to the port that outputs, but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 112 may be based on some piece of doped fiber, exhibiting absorption within a certain wavelength range. The VOA 112 may also be tuned in synchronization with any of the tunable DCMs included in the amplification module 101 (for example, DCM 106, DCM 107, and/or DCM 109). That is the tunable DCMs and the VOA 112 may be tuned for the same transmission distance. The VOA 112 may output the amplified downstream optical data signals to WDM 105. In some embodiments, the WDM 105 may operate similarly to the WDM 104. That is, the WDM 105 may serve to combine or separate signals in the downstream L band and the upstream C band (in embodiments in which the downstream includes the L band and the upstream includes the C band). Including a DCM on both downstream and upstream directions may allow future transport of 25G signals.

In some embodiments, from the WDM 105, the signal may be provided to the optical switch 118. The optical switch 118 may be used to determine which fiber to use to transmit the downstream signal from the amplification module 101 to the one or more customer devices (not shown in the figure). For example, the optical switch 118 may use a first fiber 135, a second fiber 136, and/or any other number of additional fibers to transmit the signal. The ability of the optical switch 118 to select between different fibers may be beneficial in that one fiber may serve as a backup in the event that a primary fiber is experiencing an issue that may impact signal transmission. For example, fiber 135 may serve as the primary fiber for signal transmission, and fiber 136 may be used as a backup fiber if the fiber 135 is experiencing transmission issues.

After traveling down the first fiber 135 and/or the second fiber 136, the downstream signal may be received by a multiplexer/demultiplexer module 140. The multiplexer/demultiplexer module 140 may include a DWDM 142 that may serve to demultiplex the downstream signal received over the first fiber 135 or the second fiber 136 into the multiple wavelengths included within the downstream signal (for example, the DWDM 142 may serve to demultiplex the received combined signal to separate out the original input signals 124 received by the amplification module 101 from the OLT 130). The individual output signals from the multiplexer/demultiplexer module 140 (for example, output signal 150, output signal 152, output signal 154, output signal 156, and/or output signal 158) may be provided to individual power splitters (for example, power splitter 144, power splitter 146, power splitter 148, power splitter 150, and/or power splitter 152), and subsequently may be provided to one or more customer devices (not shown in the figure).

Turning to signal transmission in the upstream direction, one or more signals may be transmitted by the one or more customer devices back through the amplification module 101 and to the OLT 130. In some cases, the one or more upstream signals from the customer devices may be transmitted over the C band. Non-limiting examples of wavelengths that may be used for these upstream C band transmissions may be shown below in Table 2 (however, any other wavelengths may also be applicable as well). However, in some cases, the one or more upstream optical data signals may also be transmitted over both the L band and the C band, just the L band, or may also be received over any other wavelength as well. These ingress optical data signals may be received by the multiplexer/demultiplexer module 140. More specifically, the ingress optical data signals from the customer devices may be received by the DWDM 142. The DWDM 142 may then function similarly to the DWDM 102 at the amplification module 101 in the downstream 120 direction. For example, the DWDM 142 may multiplex the one or more ingress optical data signals including multiple C band wavelength channels into a multi-wavelength upstream optical data signal. That is, the DWDM 142 may serve to both demultiplex downstream signals and to also multiplex upstream signals. The multi-wavelength upstream optical data signal may then be transmitted back to the amplification module 101 in the upstream direction over the one or more fibers (for example, the fiber 135 and/or the fiber 136).

TABLE 2

| | 50 GHz CS | | 100 GHz CS | | 200 GHz CS | |
|---|---|---|---|---|---|---|
| Channel | Frequency (THz) | Wavelength (nm) | Frequency (THz) | Wavelength (nm) | Frequency (THz) | Wavelength (nm) |
| 1 | 195.25 | 1535.43 | 195.6 | 1532.68 | 196.1 | 1528.77 |
| 2 | 195.20 | 1535.82 | 195.5 | 1533.47 | 195.9 | 1530.33 |
| 3 | 195.15 | 1536.22 | 195.4 | 1534.25 | 195.7 | 1531.90 |

TABLE 2-continued

| | 50 GHz CS | | 100 GHz CS | | 200 GHz CS | |
|---|---|---|---|---|---|---|
| Channel | Frequency (THz) | Wavelength (nm) | Frequency (THz) | Wavelength (nm) | Frequency (THz) | Wavelength (nm) |
| 4 | 195.10 | 1536.61 | 195.3 | 1535.04 | 195.5 | 1533.47 |
| 5 | 195.05 | 1537.00 | 195.2 | 1535.82 | 195.3 | 1535.04 |
| 6 | 195.00 | 1537.40 | 195.1 | 1536.61 | 195.1 | 1536.61 |
| 7 | 194.95 | 1537.79 | 195.0 | 1537.40 | 194.9 | 1538.19 |
| 8 | 194.90 | 1538.19 | 194.9 | 1538.19 | 194.7 | 1538.77 |

In some embodiments, the amplification module 101 may receive the upstream signal transmission from the multiplexer/demultiplexer module 140 at the optical switch 118. The optical switch 118 may then provide the upstream signal to one or more Raman pumps 116. Any number of Raman pumps may be used. Downstream signals may be broadcasted to all customer devices (for example, the same signals may be sent to all customer devices simultaneously so standard saturated mode EDFAs can be utilized). Upstream signals may be Time-Wavelength-Division-Multiplexed signals (TWDM-PON). That is, the upstream signals may not be transmitted at the same time, so the signals may be "bursty" in nature. The Raman pumps may then in the upstream direction may allow for better performance since they may not contribute to overall signal noise. This may be a factor in longer fiber links which may be limited by an actual optical signal to noise ratio (OSNR) of an upstream EDFA (EDFAs may add noise depending on the input optical power provided to the EDFA).

In some embodiments, the remaining elements included in the upstream 122 signal transmission direction of the amplification module 101 may also function similarly to the elements included in the downstream 120 direction. That is, the WDM 105 may receive the upstream signal and may serve to combine or separate signals in the downstream L band and the upstream C band (in embodiments in which the downstream includes the L band and the upstream includes the C band). From the WDM 105, the upstream signal may travel to the amplifier 114. The amplifier 114 may provide the signal to the VOA 110, which may provide the signal to the DCM 109, the WDM 104, and/or the DCM 106 depending on the DCMs that are included in the amplification module 101. For example, as mentioned above, in some embodiments, the amplification module 101 may only include the DCM 106, the DCMs 107 and 109, or any other combination of DCMs. In embodiments in which only the DCM 106 is included, then the upstream signal may travel from the VOA 110 directly to the WDM 104, from the WDM 104 to the DCM 106, and then to the DWDM 102. However, if the DCM 107 and DCM 109 are included and the DCM 106 is not included, then the upstream signal may travel from the VOA 110 to the DCM 109, from the DCM 109 to the WDM 104, and then directly from the WDM 104 to the DWDM 102. Finally, The DWDM 102 may then demultiplex the combined upstream data signal into one or more output signals 126, and the one or more output signals may be output from the amplification module 101 and transmitted to the OLT 130.

FIG. 2 depicts an example system 200 including an amplification module 201 that may be used in conjunction with one or more Optical Communications Module Link (OCML) Extenders (for example, OCML 250, OCML 252, OCML 254, and/or OCML 256, as well as any other number of OCMLs). The OCMLs may be illustrated in more detail, for example, in FIGS. 3-6. Using the amplification module 201 in conjunction with one or more OCMLs may allow for Ethernet signals to be transmitted on the same fiber as signals being transmitted over a PON network. For example, the amplification module 201 may receive signals over a PON network, provide the signals to the one or more OCMLs, and the one or more OCMLs may also separately receive one or more Ethernet signals. The OCMLs may then be able to transmit the PON signals from the amplification module 201 as well as the Ethernet signals (and any other signals received by the OCMLs).

In some embodiments, the amplification module 201 may be the same as, or similar to, the amplification module 101 depicted in FIG. 1. That is, the amplification module 201 may include at least one or more dense wave division multiplexers (DWDMs) (for example, DWDM 202 and DWDM 242), one or more wavelength-division multiplexers (WDMs) (for example, WDM 204 and WDM 205), one or more dispersion compensation modules (DCMs) (for example, DCM 206, DCM 207, and DCM 209), one or more amplifiers (for example, amplifier 208 and amplifier 214), one or more variable optical amplifiers (VOAs) (for example, VOA 210 and VOA 212). Although not depicted in the figure, the amplification module 201 may also include one or more Raman pumps and/or an optical switch as well. In some embodiments, the system 200 in which the amplification module 201 is included may also include one or more OCMLs (for example, OCML 250, OCML 252, OCML 254, and/or OCML 256, as well as any other number of OCMLs). In some embodiments, the amplification module 201 may differ from the amplification module 101 in that the amplification module 201 may include a second DWDM (for example, DWDM 242). Similar to the DWDM 142 included in the multiplexer/demultiplexer module 142 in FIG. 1, the DWDM 242 may receive a downstream multiwavelength downstream optical data signal and may demultiplex the multi-wavelength downstream optical data signal into individual signals at different wavelengths or wavelength ranges to provide to the individual OCMLs. However, the DWDM 242 may be optional in that the multi-wavelength downstream optical data signal may simply be provided to a signal OCML or all of the OCMLs.

In some embodiments, a signal may traverse through the elements of the amplification module 201 in a similar manner in which a signal may traverse through the elements of the amplification module 101. For example, the DWDM 202 may receive one or more inputs 224. The one or more inputs 224 may be received from an OLT, for example (not shown in the figure). The one or more inputs may include individual signal inputs received over different L or C band channels at different wavelengths and/or wavelength ranges (the specific wavelengths and number of inputs depicted in the figure may merely be exemplary). The DWDM 202 may multiplex the one or more inputs 224 to produce a multi-wavelength downstream optical data signal. The multi-wavelength downstream optical data signal may then be provided to either the DCM 206 or the WDM 204 depending on the embodiments (that is, the amplification module may include any of the DCM 206, DCM 207, or DCM 209 in any combination similar to the amplification module 101). From the WDM 204, the signal may be provided to the DCM 207 (in embodiments in which the DCM 207 is used). The signal may then be provided to the amplifier 208, the VOA 210, the WDM 205, and the DWDM 242. Finally, the DWDM may demultiplex the multi-wavelength upstream optical data signal back into individual signals, and the individual signals may be provided to the one or more OCMLs (for example, OCML 250, OCML 252, OCML 254, and OCML 256) as one or more outputs 230. In some cases, the one or more outputs may correspond to the same wavelengths or wavelength ranges included in the one or more inputs 224. That is, the one or more inputs 224 may traverse the amplification module 201 as a combined multi-wavelength downstream optical data signal, and may be separated again before being output from the amplification module 201 and provided to the one or more OCMLs.

In some embodiments, a signal may also transmit in the upstream direction in a similar manner. That is, the one or more OCMLs may provide one or more upstream signals to the amplification module 201. The one or more upstream signals may be transmitted over the same wavelengths as the outputs 230, in some cases. The amplification module 201 may receive the one or more upstream signals at the DWDM 242, which may multiplex the one or more upstream signals into a single multi-wavelength upstream optical data signal (similar to the manner in which the DWDM 102 multiplexes the one or more inputs 224 into the multi-wavelength downstream optical data signal). The multi-wavelength upstream optical data signal may then be provided to the WDM 205. The WDM 205 may receive the upstream signal and may serve to combine or separate signals in the downstream L band and the upstream C band (in embodiments in which the downstream includes the L band and the upstream includes the C band). From the WDM 205, the upstream signal may travel to the amplifier 214. The amplifier 214 may provide the signal to the VOA 210, which may provide the signal to the DCM 209, the WDM 205, and/or the DCM 206 depending on the DCMs that are included in the amplification module 201. For example, as mentioned above, in some embodiments, the amplification module 201 may only include the DCM 206, the DCMs 207 and 209, or any other combination of DCMs. In embodiments in which only the DCM 106 is included, then the upstream signal may travel from the VOA 210 directly to the WDM 204, from the WDM 204 to the DCM 206, and then to the DWDM 202. However, if the DCM 207 and DCM 209 are included and the DCM 206 is not included, then the upstream signal may travel from the VOA 210 to the DCM 209, from the DCM 209 to the WDM 204, and then directly from the WDM 204 to the DWDM 202. Finally, The DWDM 202 may then demultiplex the combined upstream data signal into one or more output signals, and the one or more output signals may be output from the amplification module 201 and transmitted to the OLT.

FIG. 3 depicts another example system 300 that includes an example amplification module 301 used in conjunction with an OCML 330. In FIG. 3, the OCML 330 may be illustrated in greater detail than the OCMLs depicted in FIG. 2. In some embodiments, the amplification module 301 may be the same as, or similar to, the amplification module 101 depicted in FIG. 1, the amplification module 201 depicted in FIG. 2, or any other amplification module depicted and/or described herein. That is, the amplification module 301 may include at least one or more dense wave division multiplexers (DWDMs) (for example, DWDM 302), one or more wavelength-division multiplexers (WDMs) (for example, WDM 304 and WDM 305), one or more dispersion compensation modules (DCMs) (for example, DCM 309), one or more amplifiers (for example, amplifier 308 and amplifier 314), one or more variable optical amplifiers (VOAs) (for example, VOA 310 and VOA 312). The amplification module 301 may also include one or more Raman pumps 316 and/or an optical switch (not depicted in the figure) as well. The amplification module 301 may also include any other elements depicted in any other amplification module that may not be depicted in the amplification module 301. For example, the amplification module 301 may only depict one DWDM 302 in contrast with the two DWDMs illustrated in the amplification module 201 of FIG. 2. This second DWDM may be added to the amplification module 301 as well, for example, if the amplification module 301 were to transmit output signals to multiple OCMLs or other downstream devices. As a second example, the amplification module 301 may include any number of DCMs in addition to DCM 309. For example, the amplification module 301 may include a DCM between the DWDM 302 and the WDM 304 and/or a DCM between the WDM 304 and the amplifier 308 (corresponding to DCMs 206 and 207 in FIG. 2).

In some embodiments, a signal may traverse through the elements of the amplification module 301 in a similar manner in which a signal may traverse through the elements of the any other amplification module described herein. For example, the DWDM 302 may receive one or more inputs 324. The one or more inputs 324 may be received from an OLT, for example (not shown in the figure). The one or more inputs may include individual signal inputs received over different L or C band channels at different wavelengths and/or wavelength ranges (the specific wavelengths and number of inputs depicted in the figure may merely be exemplary). The DWDM 302 may multiplex the one or more inputs 324 to produce a multi-wavelength downstream optical data signal. The multi-wavelength downstream optical data signal may then be provided to the WDM 204 (or to a DCM that is not depicted in the figure if such a DCM were included in an embodiment). From the WDM 204, the signal may be provided to the amplifier 208, the VOA 210, and the WDM 205. The signal may also be provided to any other elements not depicted in FIG. 3 that may be depicted in other amplification modules (such as a second DWDM, a second DCM, etc.). Finally, the amplification module 301 may output the multi-wavelength downstream optical data signal to the OCML 330. In some cases, the one or more outputs may correspond to the same wavelengths or wavelength ranges included in the one or more inputs 324. That is, the one or more inputs 324 may traverse the amplification module 301 as a combined multi-wavelength downstream optical data signal, and may be separated again before being output from the amplification module 301 and provided to the OCML 330.

In some embodiments, a signal may also transmit in the upstream direction in a similar manner. That is, the OCML 330 may provide one or more upstream signals to the amplification module 301. The amplification module 301 may receive the one or more upstream signals at the Raman pumps 316 (any number of Raman pumps may be used). As depicted in the figure, the Raman pumps may alternatively be included within the OCML 330 instead of the amplification module 301 (for example, shown as Raman pumps 360 in the OCML 330). Any number of Raman pumps may be used in the OCML 330 and/or the amplification module 301. In some cases, Raman pumps may be included in both the OCML 330 and the amplification module 301. Additionally, Raman pumps may be included in any amplification module and/or any OCML depicted in any of the other figures included herein as well (even those that do not depict Raman pumps). The multi-wavelength upstream optical data signal may then be provided to the WDM 305. The WDM 305 may receive the upstream signal and may serve to combine or separate signals in the downstream L band and the upstream C band (in embodiments in which the downstream includes the L band and the upstream includes the C band). From the WDM 305, the upstream signal may travel to the amplifier 314. The amplifier 314 may provide the signal to the VOA 310, which may provide the signal to the DCM 309, and the WDM 305. Finally, The DWDM 302 may then demultiplex the combined upstream data signal into one or more output signals, and the one or more output signals may be output as output signals 326 from the amplification module 301 and transmitted to the OLT.

In some embodiments, the OCML 330 may provide a more detailed depiction of an OCML that may be used in conjunction with an amplification module (for example, amplification module 101, amplification module 201, amplification module 301, and/or any other amplification module) as described herein. Even further depictions of an example OCML may be found in at least FIGS. 4-6 as well. In some embodiments, the OCML 330 may be located at a headend, but may also be located at any other portion of the system 300 (for example, any other portion of a network as described herein). As shown in FIG. 3, OCML 330 may be a smart integrated OCML headend, which may be a circuit comprising one or more DWDMs (for example, DWDM 338), one or more circulators (for example, circulator 342 and 346), one or more DCMs (for example, DCM 340 and 344) (which may be tunable or fixed DCMs), one or more VOAs (for example, VOA 346 and/or VOA 352), one or more WDMs (for example, WDM 364 and WDM 368), one or more amplifiers (for example, optical amplifier 350 and/or optical amplifier 348), one or more filtering elements 358, and one or more optical switches (for example, optical switch 362) to feed a primary optical fiber (for example, Primary Fiber 380) or secondary (backup) optical fiber (for example, Secondary Fiber 382) (as well as any number of additional fibers). The OCML 330 may provide a method for transporting multiple signals using the C band and L band of signal wavelengths. In some instances, the C band may refer to a range of wavelengths from 1528.8 to 1566.3 and the L band may refer to a range of wavelengths from 1568.77 to 1610.49, for example. Examples of signals that may be transported using these wavelength bands may include at least GPON/XGPON/10GEPON,25G/50G PON, 25G Non-return-to-zero (NRZ), 25G Quasi-Coherent, 25 and/or 50G Pulse-Amplitude Modulation (PAM4), 100-600G Coherent, and/or Duo-Binary signals (and/or any other type of signal) and a field hub or outside plant. The MTC facility may be an inside plant facility where a cable company acquires and combines services to be offered to customers. The MTC facility may provide these combined services to customers, by transmitting and receiving optical signals over a plurality of optical fibers to a field hub or outside plant which connects the plurality of optical fibers to a customer's premise. The OCML 330 may be located in a secondary terminal center (STC) that connects the MTC facility to a field hub or outside plant housing a multiplexer-demultiplexer (MDM) 390. The OCML 330 may also be located in the MTC or in any other location along a transmission path of the signals.

In some embodiments, the OCML 330 may be used to transport a mix of multi-wavelength signals, which may include, for example, 10-400 GbE, GPON, XGPON/10GE-PON, 25G Non-return-to-zero (NRZ), 25G Quasi-Coherent, 25 and/or 50G Pulse-Amplitude Modulation (PAM4), 100-600G Coherent, and/or Duo-Binary signals, over the same optical fiber without having active devices such as optical amplifiers in the field. These are merely examples of signals that may be transported, and any other type of signal may also be transported as well. Throughout the disclosure reference may be made to any individual example signal or a combination of example signals, but any other type of signal could similarly be applicable. The OCML 330 may also be configured to support the same wavelengths over a secondary optical fiber via an optical switch in case the primary optical fiber experiences a cut. In one embodiment, an OCML 330, systems, and methods may include various subsystems integrated into a single module including an integrated DWDM passive circuit that combines and separates bi-directional wavelengths in optical fibers propagating in a conventional wavelength window, such as the c band dispersive region of the optical fibers. The OCML 330 may comprise one or more DWDMs, one or more circulators, one or more DCMs (which may be tunable DCMs), one or more VOAs, one or more WDMs, one or more amplifiers, one or more coexistence filtering elements, and one or more optical switches to feed a primary optical fiber or secondary (backup) optical fiber, (as well as any number of additional fibers).

In some embodiments, OCML 330 may comprise at least twenty-four downstream transponders 334 and at least twenty-four upstream transponders 336. In some cases, the OCML 330 may also comprise any other number of downstream transponders 334 and/or upstream transponders 336. That is, while reference may be made herein to "twenty-four" transponders, this should not be taken as limiting, and any other number may also be applicable. The downstream transponders 334 may transmit downstream data over twenty-four wavelengths. The upstream transponders 336 may receive upstream data over, such as, for example, GPON/XGPON/10GEPON, 25G Non-return-to-zero (NRZ), 25G Quasi-Coherent, 25 and/or 50G Pulse-Amplitude Modulation (PAM4), 100-600G Coherent, Duo-Binary, and/or any other type of signal. In some instances, twelve of the downstream transponders 334 may use the C band and twelve of the downstream transponders 334 may use the L band. Similarly, twelve of the upstream transponders 336 may use the C band and twelve of the upstream transponders 336 may use the L band. However, any other combination of numbers of wavelengths for the C and L bands may also be applicable as well. For example, all of the downstream transponders 334 may use the L band or the C band and all of the upstream transponders 336 may use the L band or C band. In even further instances, any other wavelengths may also be used. Additionally, the downstream and upstream signal wavelengths may be capable of transporting signals on adjacent channels, rather than using a block of channels for downstream transmission and a block of channels for upstream transmission, with a guard band of a particular number of wavelengths included between the two channel blocks. Alternatively, the downstream and upstream signal wavelengths may still be transmitted in separate blocks, however.

OCML 330 may also comprise one or more PON connectors 332, which may be used to transmit/receive any type of PON signal, such as, for example, GPON, XGPON, NG-PON2, 25G/50G-PON, and/or any other type of PON signal. In some cases, the one or more PON connectors 332 may receive output PON signals from the amplification module 301. OCML 330 may also comprise a primary optical fiber (for example, primary optical fiber 380) and a secondary optical fiber (for example, secondary optical fiber 382) that transmit and receive a plurality of optical signals. Primary optical fiber 380 and secondary optical fiber 382 may transmit a first plurality of signals from OCML 330 to an outside plant, and may receive a second plurality of signals from the outside plant. In some embodiments, any other number of optical fibers may be provided (for example, more than just the primary and secondary optical fibers).

In some embodiments, downstream transponders 334 and upstream transponders 336 may comprise connectors belonging to the laser shock hardening (LSH) family of connectors designed to transmit and receive optical data signals between DWDM 302, and one or more servers (not shown). In other embodiments, downstream transponders 334 and upstream transponders 336 may also comprise E2000 connectors, and may utilize a 1.25 millimeter (mm) ferrule. downstream transponders 334 and upstream transponders 336 may be installed with a snap-in and push-pull latching mechanism, and may include a spring-loaded shutter which protects the ferrule from dust and scratches. The shutter may close automatically once the connector is disengaged, locking out impurities, which could later result in network failure, and locking in possibly damaging lasers. downstream transponders 334 and upstream transponders 336 may operate in a single mode or a multimode. In single mode, downstream transponders 334 and upstream transponders 336 only one mode of light may be allowed to propagate. Because of this, the number of light reflections created as the light passes through the core of single mode downstream transponders 334 and upstream transponders 336 decreases, thereby lowering attenuation and creating the ability for the optical data signal to travel further. Single mode may be for use in long distance, higher bandwidth connections between one or more servers and DWDM 338. In multimode, downstream transponders 334 and upstream transponders 336, may have a large diameter core that allows multiple modes of light to propagate. Because of this, the number of light reflections created as the light passes through the core increase, creating the ability for more data to pass through at a given time. Multimode downstream transponders 334 and upstream transponders 336, may generate high dispersion and a attenuation rate, which may reduce the quality of an optical data signal transmitted over longer distances. Therefore multimode may be used to transmit optical data signals over shorter distances. In some embodiments, the downstream transponders 334 and upstream transponders 336 may also comprise any other types of connectors as well.

In some embodiments, OCML 330 can transmit and receive up to at least twenty-four bi-directional optical data signals (or more than twenty-four signals in some instances), but the actual number of optical data signals may depend on operational needs. That is, OCML 330 can transport more or less than twenty-four downstream optical signals, or more or less than twenty-four upstream optical data signals, based on the needs of customers' networks. These customer networks may be connected to OCML 330 through an optical ring network (for example, a metro access optical ring network).

The operation of OCML 330 may be described by way of the processing of downstream optical data signals transmitted from OCML 330 to a field hub or outside plant, and the processing of upstream optical data signals received from the field hub or outside plant. In terms of downstream processing, each of the transponders of downstream transponders 334 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four transponders in downstream transponders 334 may each receive a SONET/SDH optical data signal, and each of the twenty-four transponders may convert the received SONET/SDH optical data signal into a corresponding second optical data signal, wherein each of the corresponding second optical data signals may have a unique wavelength. That is, the wavelength of each of the corresponding second optical data signals may be distinguishable from the wavelength of any of the other corresponding second optical data signals. Thus downstream transponders 334 may generate twenty-four corresponding second optical data signals each of which has a unique wavelength.

DWDM 338 may receive the twenty-four corresponding second optical data signals over the L and C bands as an input and output a multi-wavelength downstream optical data signal comprising the twenty-four corresponding second optical data signals onto a fiber. More specifically, DWDM 338 may multiplex the twenty-four corresponding second optical data signals onto the fiber, wherein the twenty-four multiplexed corresponding second optical data signals compose the multi-wavelength downstream optical data signal. The multi-wavelength downstream optical data signal may have a wavelength comprising the twenty-four wavelengths of the twenty-four corresponding second optical data signals.

In some embodiments, the multi-wavelength downstream optical data signal, may be input to a circulator (e.g. circulator 342). The circulator 342 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 342 may enable the use of the same wavelength for both downstream and upstream and upstream purposes. Circulators may be one directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. circulator 342 may be round baud single or dual stage circulator that receives the downstream optical signal from the DWDM 338 and outputs a corresponding downstream optical signal to DCM 340. In some embodiments, the circulators 342 and 362 may be replaced by WDMs as well (including any other circulators included in any other OCMLs illustrated in any of the figures).

After being output by the circulator 342, the downstream optical data signal may be input into DCM 340 to compensate for dispersion that downstream optical data signal may experience. In some embodiments, DCM 340 may be configured to balance positive and/or negative dispersion that may be introduced to the egress optical data signal by the fiber. In some embodiments, DCM 508 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 340 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 340 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

In some embodiments, DCM 340 output the downstream optical data signal to amplifier 350. The amplifier 350, as well as any other amplifiers described herein, may allow operation over a full transmission spectrum, which may include at least 48 transmission channels. That is, the amplifier 350 may be a wide-band amplifier. To support 48 channels, the amplifier 350 may optimize gain flatness and noise for the broader channel range (for example, 40 channels included with some of the other OCML systems described herein to 48 channels in OCML 501). A gain of the amplifier 350 may be based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of booster amplifier 350 may be adjusted based at least in part on the attenuation coefficient and length of fiber that the egress optical data signal will travel. More specifically, in some instances, the gain of booster optical amplifier 524 may be $G = e^{(2\alpha L)}$, where α is the fiber attenuation coefficient, as explained above, and L is the length of the fiber (for example, the length of primary fiber 380 and/or the length of secondary fiber 382). The downstream optical data signals received from the DCM 340 may be amplifier by amplifier 350 and may be outputted to variable optical attenuator (VOA) 352.

In some embodiments, VOA 352 may receive the amplified downstream optical data signals as an input, and may be used to reduce the power levels of the downstream optical data signals. The power reduction may done by absorption, reflection, diffusion, scattering, deflection, diffraction, and dispersion, of the amplified downstream optical data signals. VOA 352 may have a working wavelength range in which it absorbs all light energy equally. In some embodiments, VOA 352 may utilize a length of high-loss optical fiber, that operates upon its input optical signal power level in such a way that its output signal power level is less than the input level. The variability of the output power level of VOA 352 may be achieved using a fiber coupler, where some of the power is not sent to the port that outputs, but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 352 may be based on some piece of doped fiber, exhibiting absorption within a certain wavelength range. The VOA 352 may also be tuned in synchronization with any of the tunable DCMs (for example, DCM 350 or any other DCM described herein). That is the tunable DCMs and the VOA 352 may be tuned for the same transmission distance. The VOA 352 may output the amplified downstream optical data signals to circulator 354.

In some embodiments, circulator 354 may be similar to circulator 342. That is, the circulator 354 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 354 may enable the use of the same wavelength for both downstream and upstream and upstream purposes. Circulators may be one directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. The circulator 354 may output the amplified downstream optical data signals received from the VOA 352 to coexistence element filter 358.

In some embodiments, the coexistence element filter 358 may receive the amplified downstream optical data signals received from the circulator 354, and may also receive signals from the one or more PON connectors 332. The coexistence element filter 358 may be a WDM element that may be used to combine all of these received signals and output one or more of the combined signals on a common output port. The coexistence element filter 358 may allow for different types of data signals to be transmitted on a single network. The coexistence element filter 358 may enable the addition of all the various types of PON signals mentioned in the application to be added to the Ethernet C and L band signals so that all the combined signals can be transported on the pair of two output ports and received by a field MDM. Examples of the coexistence element filter 358 may be provided in at least FIGS. 8A-8C. The coexistence element filter 358 may output one or more optical data signals to optical switch 362.

In some embodiments, the optical switch 362 may output the one or more optical data signals received from the coexistence element filter 358 to a primary fiber 380 and/or a secondary fiber 382 as well as any number of additional fibers not depicted in the figure). Also included on the primary fiber 380 and/or the secondary fiber 382 may be one or more test points (for example, test points 370 and 371 corresponding with primary fiber 380 and test points 373 and 374 corresponding with secondary fiber 382) and/or one or more Optical Time Domain Reflectometry (OTDR) ports (for example, OTDR ports 372 and/or 375). The test points may be used for monitoring downstream and upstream signals being transmitted over the primary fiber 380 and/or secondary fiber 382. The OTDR ports may allow for continuous monitoring of fibers in the presence of data for fiber degradation or fiber cuts. If a fiber cut happens, the OTDR may enable the location to be determined immediately, significantly reducing outages. OTDR functionality may be enabled via a WDM (for example, WDM 364 and/or WDM 368) and an external port (for example, the OTDR ports 372 and/or 375) on the OCML 330 for injecting an OTDR signal (which may be, for example, 1625 or 1650 nm). The WDMs may be located after the optical switch 362 so the OTDR monitoring is independent of which link is carrying downstream traffic. Both the links may always have upstream traffic present, (for example, an MDM 390 may incorporate a 50% splitter which splits the upstream signal evenly between the primary and secondary fiber). The OCML's OTDR injection ports may be specified with a degree of required isolation between the OTDR's 1625/1650 nm and traffic bearing C-band wavelengths. This traffic could be 10G or Coherent 100G/200G, for example. The additional insertion loss associated with the components required to inject the OTDR pulse and to protect transmit/receive equipment from the backscattered or transmitted OTDR signals. The additional insertion losses may be ≤0.5 dB and thus can be easily accommodated within the system link budget.

In some embodiments, the optical data signals output to the primary fiber 380 and/or secondary fiber 382 may be transmitted to the MDM 390. The optical data signals may then be received at optical splitter 391 as an ingress optical data signal. Optical splitter 391 may also be referred to as a beam splitter, and may comprise one or more quartz substrates of an integrated waveguide optical power distribution device. However, optical splitter 391 may also be any other type of optical splitter as well. Optical splitter 391 may be a passive optical network device. It may be an optical fiber tandem device comprising one or more input terminals and one or more output terminals. Optical splitter 391 may be Fused Biconical Taper (FBT) splitter or Planar Lightwave Circuit (PLC) splitter. Optical splitter 391 may be a balanced splitter wherein optical splitter 391 comprises 2 input fibers and one or more output fibers over which the ingress optical data signal may be spread proportionally. In some embodiments, the ingress optical data signal may not be spread proportionally across the output fibers of optical splitter 391. In some embodiments, optical splitter 391 may comprise 2 input fibers and 2 output fibers. A first input fiber of optical splitter 374 may be connected to primary fiber 380 and a second input fiber of optical splitter 376 may be connected to secondary fiber 382.

A first output fiber 395 of optical splitter 391 may be connected to a first DWDM 392. A second output fiber 396 of optical splitter 391 may be connected to a second DWDM 394. Because the downstream optical data signals may be multi-wavelength downstream optical data signal, the first DWDM 392 and/or second DWDM 394 may demultiplex the downstream optical data signals into individual optical data signals in accordance with the individual wavelengths of the one or more downstream optical data signals. More specifically, the first DWDM 392 may be provided the PON signals received by the OCML through the one or more PON connectors 332 and the second DWDM 392 may be provided the signals received by the OCML 330 through the one or more downstream transponders 334 (which may be Ethernet signals, for example). That is, the PON signals received from the amplification module 301 and the additional signals received through the OCML may be separated so that they may be provided to their corresponding customers devices. This may allow the OCML to transmit both PON signals as well as other types of signals (for example, Ethernet) over the same fiber(s) Similar to any other DWDM described herein, the first DWDM 392 and second DWDM 394 may serve to demultiplex the one or more downstream optical data signals into their multiple original signals. These demultiplexed signals may then be output. For example, the PON signals may be shown at output 397 and the other signals received by the OCML may be shown as outputs 398. As mentioned above, these output signals may then ultimately be provided to corresponding customer devices.

The operation of MDM 390 may be further described by way of the processing of an upstream optical data signal transmitted to OCML 330. Each of the upstream transponders 399 of the DWDM 394 may receive a SONET/SDH optical data signal and may convert the SONET/SDH optical data signal into an electrical signal. Each of the upstream transponders 399 may receive the SONET/SDH optical data signal from a customer device and/or any additional device included between the MDM 390 and one or more customer devices (such as one or more remote physical (PHY) devices that may not be shown in the figure).

More specifically, a first transceiver in the upstream transponders 399 may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four upstream transponders 555 may each receive a SONET/SDH optical data signal, and each of the twenty-four upstream transponders 399 may convert the received SONET/SDH optical data signal into a corresponding second optical data signal, wherein each of the corresponding second optical data signals has a unique wavelength. That is, the wavelength of each of the corresponding second optical data signals may be distinguishable from the wavelength of any of the other corresponding second optical data signals. Thus upstream transponders 399 may generate twenty-four corresponding second optical data signals each of which has a unique wavelength.

DWDM 394 may receive twenty corresponding second optical data signals as an input and output a multi-wavelength upstream optical data signal comprising the twenty-four corresponding second optical data signals. More specifically, DWDM 394 may multiplex the twenty-four corresponding second optical data signals onto the fiber 396 connecting DWDM 394 and optical splitter 391, wherein the twenty multiplexed corresponding second optical data signals compose the multi-wavelength downstream optical data signal. The multi-wavelength optical data signal may have a wavelength comprising the twenty-four wavelengths of the twenty-four corresponding second optical data signals. Additionally, DWDM 392 may receive one or more upstream signals as well (such as, for example, GPON, 25G/50G-PON, XG-PON1, NG-PON2, or any other type of signal). These signals may also be outputted by the DWDM 392 to the optical splitter 391. Optical splitter 391 may receive one or more upstream PON signals from the DWDM 392, and may also receive the multi-wavelength upstream optical data signal from the DWDM 394. Optical splitter 391 may output an egress optical data signal, which may be a multi-wavelength optical data signal. Optical splitter 391 may output the egress optical data signal onto primary fiber 380 or secondary fiber 382 connecting the optical splitter 391 to the OCML 330. The signal may then be received by the OCML 330 and may progress through the OCML 330 and/or the amplification module 301 in a similar manner in which it progressed downstream through the OCML 330 and the amplification module 301.

FIG. 4 depicts another example system 400 that includes an example amplification module 401 used in conjunction with an OCML 430. The system 400 may include similar elements as the system 300 depicted in FIG. 3, but may differ from the system in the elements that may be included within the MDM 490 that is downstream from the OCML

430. That is, the amplification module 401 may include at least one or more dense wave division multiplexers (DWDMs) (for example, DWDM 402), one or more wavelength-division multiplexers (WDMs) (for example, WDM 404 and WDM 405), one or more dispersion compensation modules (DCMs) (for example, DCM 407 and/or DCM 409), one or more amplifiers (for example, amplifier 408 and amplifier 414), one or more variable optical amplifiers (VOAs) (for example, VOA 410 and VOA 412). The amplification module 401 may also include one or more Raman pumps 416 and/or an optical switch (not depicted in the figure) as well. The amplification module 401 may also include any other elements depicted in any other amplification module that may not be depicted in the amplification module 401. For example, the amplification module 401 may only depict one DWDM 402 in contrast with the two DWDMs illustrated in the amplification module 201 of FIG. 2. This second DWDM may be added to the amplification module 401 as well, for example, if the amplification module 401 were to transmit output signals to multiple OCMLs or other downstream devices. As a second example, the amplification module 401 may include any number of DCMs in addition to DCM 409. For example, the amplification module 401 may include a DCM between the DWDM 402 and the WDM 404 and/or a DCM between the WDM 404 and the amplifier 408 (corresponding to DCMs 206 and 207 in FIG. 2).

Similarly, in some embodiments, the OCML 430 may be a smart integrated OCML headend, which may be a circuit comprising one or more DWDMs (for example, DWDM 438), one or more circulators (for example, circulator 442 and 446), one or more DCMs (for example, DCM 440 and 444) (which may be tunable or fixed DCMs), one or more VOAs (for example, VOA 446 and/or VOA 452), one or more WDMs (for example, WDM 464 and WDM 468), one or more amplifiers (for example, optical amplifier 450 and/or optical amplifier 448), one or more filtering elements 458, and one or more optical switches (for example, optical switch 462) to feed a primary optical fiber (for example, Primary Fiber 480) or secondary (backup) optical fiber (for example, Secondary Fiber 482) (as well as any number of additional fibers). The OCML 430 may provide a method for transporting multiple signals using the C band and L band of signal wavelengths. In some instances, the C band may refer to a range of wavelengths from 1528.8 to 1566.3 and the L band may refer to a range of wavelengths from 1568.77 to 1610.49, for example. Examples of signals that may be transported using these wavelength bands may include at least GPON/XGPON/10GEPON, 25G/50G PON, 25G Non-return-to-zero (NRZ), 25G Quasi-Coherent, 25 and/or 50G Pulse-Amplitude Modulation (PAM4), 100-600G Coherent, and/or Duo-Binary signals (and/or any other type of signal) and a field hub or outside plant. The MTC facility may be an inside plant facility where a cable company acquires and combines services to be offered to customers. The MTC facility may provide these combined services to customers, by transmitting and receiving optical signals over a plurality of optical fibers to a field hub or outside plant which connects the plurality of optical fibers to a customer's premise. The OCML 430 may be located in a secondary terminal center (STC) that connects the MTC facility to a field hub or outside plant housing a multiplexer-demultiplexer (MDM) 490. The OCML 430 may also be located in the MTC or in any other location along a transmission path of the signals.

In some embodiments, the MDM 490 may include some different elements from the MDM 390 depicted in FIG. 3. That is, the MDM 490 may include a coexistence filer 492 in place of, or in addition to, the first DWDM 392 depicted in FIG. 3. In some embodiments, the optical data signals output to the primary fiber 480 and/or secondary fiber 482 may be transmitted to the MDM 490. The optical data signals may then be received at optical splitter 491 as an ingress optical data signal. Optical splitter 491 may also be referred to as a beam splitter, and may comprise one or more quartz substrates of an integrated waveguide optical power distribution device. However, optical splitter 491 may also be any other type of optical splitter as well. Optical splitter 491 may be a passive optical network device. It may be an optical fiber tandem device comprising one or more input terminals and one or more output terminals. Optical splitter 491 may be Fused Biconical Taper (FBT) splitter or Planar Lightwave Circuit (PLC) splitter. Optical splitter 491 may be a balanced splitter wherein optical splitter 491 comprises 2 input fibers and one or more output fibers over which the ingress optical data signal may be spread proportionally. In some embodiments, the ingress optical data signal may not be spread proportionally across the output fibers of optical splitter 491. In some embodiments, optical splitter 491 may comprise 2 input fibers and 2 output fibers. A first input fiber of optical splitter 491 may be connected to primary fiber 480 and a second input fiber of optical splitter 491 may be connected to secondary fiber 482.

A first output fiber of optical splitter 491 may be connected to a coexistence filter element 492. The coexistence filter element 491 may be similar to coexistence filter element 532 described in FIG. 5, or any other coexistence filter element described herein. A second output fiber of optical splitter 491 may be connected to a DWDM 494. Because the downstream optical data signals may be multi-wavelength downstream optical data signal, DWDM 494 may demultiplex the downstream optical data signals into individual optical data signals in accordance with the individual wavelengths of the one or more downstream optical data signals. More specifically, the one or more downstream optical data signals may be demultiplexed into twenty-four optical data signals (or any other number of optical data signals), each of which may have a unique wavelength. DWDM 494 may output each of the twenty-four optical data signals to each of the downstream transponders 498. Each of the transponders may be in a RPD (not shown) and may convert a received corresponding optical data signal, of the optical data signals, into a corresponding electrical signal. More specifically, a first transceiver in each of the downstream transponders 554 may convert each of the twenty-four optical data signals into the corresponding electrical signal. Each of the downstream transponders 498 may also comprise a second transceiver that may convert the corresponding electrical signal into a SONET/SDH optical data signal with a corresponding SONET/SDH optical data signal wavelength. In some embodiments, each of the twenty-four corresponding SONET/SDH optical data signals may have the same wavelength. In other embodiments, each of the twenty-four corresponding SONET/SDH optical data signals may have unique wavelengths.

Figure 5A:
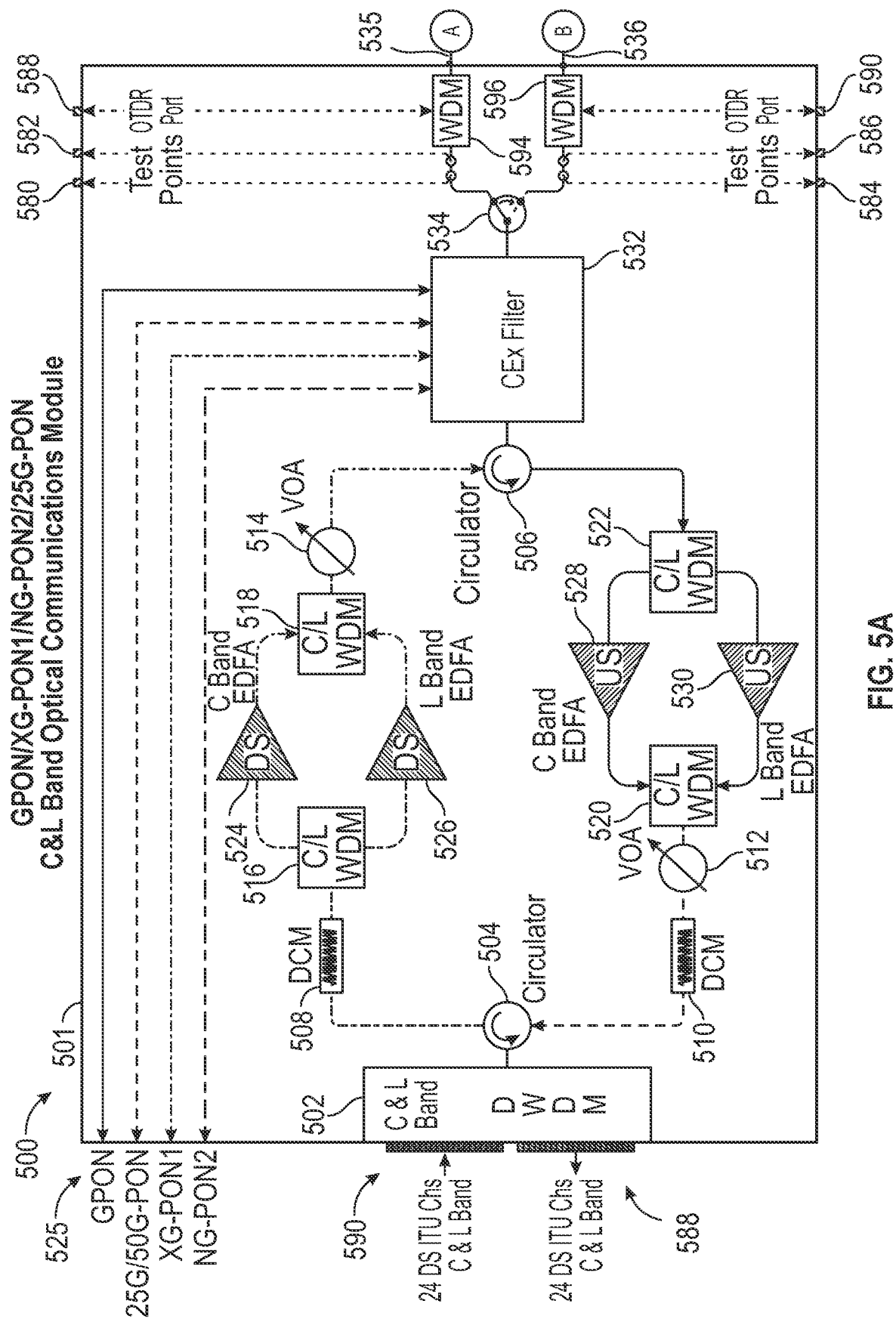
FIG. 5A depicts an example system architecture of an Optical Communications Module Link (OCML) Extender, in accordance with the disclosure.
Figure 5A:
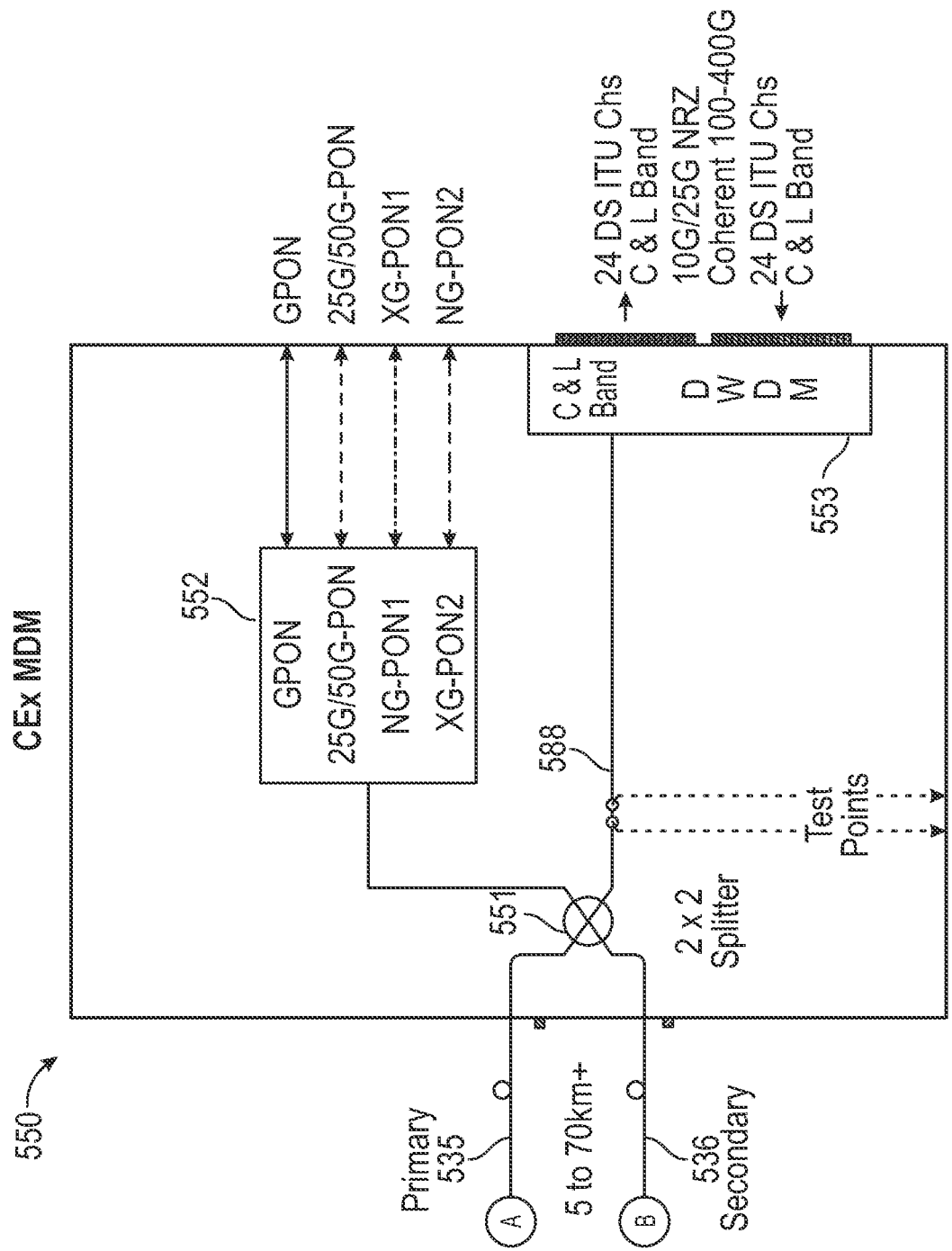

FIG. 5A depicts an example system 500 architecture of an OCML 501 according to at least one embodiment of the disclosure. The OCML 501 may provide a more detailed depiction of an OCML that may be used in conjunction with an amplification module (for example, amplification module 101, amplification module 201, amplification module 301, and/or any other amplification module) as described herein. As shown in FIG. 5A, OCML 501 may be a smart integrated OCML headend, which may be a circuit comprising one or more DWDMs (for example, DWDM 502), one or more circulators (for example, circulator 504 and 506), one or more DCMs (for example, DCM 508 and 510) (which may be tunable DCMs), one or more VOAs (for example, VOA 512 and/or VOA 514), one or more WDMs (for example, WDM 516, WDM 518, and WDM 520, and WDM 522), one or more amplifiers (for example, optical amplifier 524, optical amplifier 526, optical amplifier 528, and optical amplifier 530), one or more filtering elements 532, and one or more optical switches (for example, optical switch 534) to feed a primary optical fiber (for example, Primary Fiber 536) or secondary (backup) optical fiber (for example, Secondary Fiber 538) (as well as any number of additional fibers). The OCML 501 may provide a method for transporting multiple signals using the C band and L band of signal wavelengths. In some instances, the C band may refer to a range of wavelengths from 1528.8 to 1566.3 and the L band may refer to a range of wavelengths from 1568.77 to 1610.49, for example. Examples of signals that may be transported using these wavelength bands may include at least GPON/XGPON/10GEPON, 25G/50G PON, 25G Non-return-to-zero (NRZ), 25G Quasi-Coherent, 25 and/or 50G Pulse-Amplitude Modulation (PAM4), 100-600G Coherent, and/or Duo-Binary signals (and/or any other type of signal) and a field hub or outside plant. The MTC facility may be an inside plant facility where a cable company acquires and combines services to be offered to customers. The MTC facility may provide these combined services to customers, by transmitting and receiving optical signals over a plurality of optical fibers to a field hub or outside plant which connects the plurality of optical fibers to a customer's premise. The OCML 501 may be located in a secondary terminal center (STC) that connects the MTC facility to a field hub or outside plant housing a multiplexer-demultiplexer (MDM) 550. The OCML 501 may also be located in the MTC or in any other location along a transmission path of the signals.

In some embodiments, the OCML headend may be used to transport a mix of multi-wavelength signals, which may include, for example, 10-400 GbE, GPON, XGPON/10GE-PON, 25G Non-return-to-zero (NRZ), 25G Quasi-Coherent, 25 and/or 50G Pulse-Amplitude Modulation (PAM4), 100-600G Coherent, and/or Duo-Binary signals, over the same optical fiber without having active devices such as optical amplifiers in the field. These are merely examples of signals that may be transported, and any other type of signal may also be transported as well. Throughout the disclosure reference may be made to any individual example signal or a combination of example signals, but any other type of signal could similarly be applicable. The OCML headend may also be configured to support the same wavelengths over a secondary optical fiber via an optical switch in case the primary optical fiber experiences a cut. In one embodiment, an OCML headend, systems, and methods may include various subsystems integrated into a single module including an integrated DWDM passive circuit that combines and separates bi-directional wavelengths in optical fibers propagating in a conventional wavelength window, such as the c band dispersive region of the optical fibers. The OCML headend may comprise one or more DWDMs, one or more circulators, one or more DCMs (which may be tunable DCMs), one or more VOAs, one or more WDMs, one or more amplifiers, one or more coexistence filtering elements, and one or more optical switches to feed a primary optical fiber or secondary (backup) optical fiber, (as well as any number of additional fibers).

In some embodiments, OCML 501 may comprise at least twenty-four downstream transponders 590 and at least twenty-four upstream transponders 588 (as well as any other number of downstream and/or upstream transponders). The downstream transponders 590 may transmit downstream data over twenty-four wavelengths. The upstream transponders 588 may receive upstream data over, such as, for example, GPON/XGPON/10GEPON, 25G Non-return-to-zero (NRZ), 25G Quasi-Coherent, 25 and/or 50G Pulse-Amplitude Modulation (PAM4), 100-600G Coherent, Duo-Binary, and/or any other type of signal. In some instances, twelve of the downstream transponders 590 may use the C band and twelve of the downstream transponders 590 may use the L band. Similarly, twelve of the upstream transponders 588 may use the C band and twelve of the upstream transponders 588 may use the L band. However, any other combination of numbers of wavelengths for the C and L bands may also be applicable as well. For example, all of the downstream transponders 590 may use the L band or the C band and all of the upstream transponders 588 may use the L band or C band. In even further instances, any other wavelengths may also be used. Additionally, the downstream and upstream signal wavelengths may be capable of transporting signals on adjacent channels, rather than using a block of channels for downstream transmission and a block of channels for upstream transmission, with a guard band of a particular number of wavelengths included between the two channel blocks. Alternatively, the downstream and upstream signal wavelengths may still be transmitted in separate blocks, however.

OCML 501 may also comprise one or more PON connectors 525, which may be used to transmit/receive any type of PON signal, such as, for example, GPON, XGPON, NG-PON2, 25G/50G-PON, and/or any other type of PON signal. In some cases, the one or more PON connectors 525 may receive output PON signals from an amplification module as illustrated in FIG. 2. OCML 501 may also comprise a primary optical fiber (for example, primary optical fiber 535) and a secondary optical fiber (for example, secondary optical fiber 536) that transmit and receive a plurality of optical signals. Primary optical fiber 535 and secondary optical fiber 536 may transmit a first plurality of signals from OCML 501 to an outside plant, and may receive a second plurality of signals from the outside plant. In some embodiments, any other number of optical fibers may be provided (for example, more than just the primary and secondary optical fibers).

In some embodiments, downstream transponders 590 and upstream transponders 588 may comprise connectors belonging to the laser shock hardening (LSH) family of connectors designed to transmit and receive optical data signals between DWDM 502, and one or more servers (not shown). In other embodiments, downstream transponders 590 and upstream transponders 588 may also comprise E2000 connectors, and may utilize a 1.25 millimeter (mm) ferrule. downstream transponders 590 and upstream transponders 588 may be installed with a snap-in and push-pull latching mechanism, and may include a spring-loaded shutter which protects the ferrule from dust and scratches. The shutter may close automatically once the connector is disengaged, locking out impurities, which could later result in network failure, and locking in possibly damaging lasers. downstream transponders 590 and upstream transponders 588 may operate in a single mode or a multimode. In single mode, downstream transponders 590 and upstream transponders 588 only one mode of light may be allowed to propagate. Because of this, the number of light reflections created as the light passes through the core of single mode downstream transponders 590 and upstream transponders 588 decreases, thereby lowering attenuation and creating the ability for the optical data signal to travel further. Single mode may be for use in long distance, higher bandwidth connections between one or more servers and DWDM 502. In multimode, downstream transponders 590 and upstream transponders 588, may have a large diameter core that allows multiple modes of light to propagate. Because of this, the number of light reflections created as the light passes through the core increase, creating the ability for more data to pass through at a given time. Multimode downstream transponders 590 and upstream transponders 588, may generate high dispersion and a attenuation rate, which may reduce the quality of an optical data signal transmitted over longer distances. Therefore multimode may be used to transmit optical data signals over shorter distances. In some embodiments, the downstream transponders 590 and upstream transponders 588 may also comprise any other types of connectors as well.

In some embodiments, OCML 501 can transmit and receive up to at least twenty-four bi-directional optical data signals (or more than twenty-four signals in some instances), but the actual number of optical data signals may depend on operational needs. That is, OCML 501 can transport more or less than twenty-four downstream optical signals, or more or less than twenty-four upstream optical data signals, based on the needs of customers' networks. These customer networks may be connected to OCML 501 through an optical ring network (for example, a metro access optical ring network).

The operation of OCML 501 may be described by way of the processing of downstream optical data signals transmitted from OCML 501 to a field hub or outside plant, and the processing of upstream optical data signals received from the field hub or outside plant. In terms of downstream processing, each of the transponders of downstream transponders 590 may receive a SONET/SDH optical data signal from a MTC and each of the transponders may convert the SONET/SDH optical data signal into an electrical signal. More specifically, a first transceiver in the transponder may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four transponders in downstream transponders 590 may each receive a SONET/SDH optical data signal, and each of the twenty-four transponders may convert the received SONET/SDH optical data signal into a corresponding second optical data signal, wherein each of the corresponding second optical data signals may have a unique wavelength. That is, the wavelength of each of the corresponding second optical data signals may be distinguishable from the wavelength of any of the other corresponding second optical data signals. Thus downstream transponders 590 may generate twenty-four corresponding second optical data signals each of which has a unique wavelength.

DWDM 502 may receive the twenty-four corresponding second optical data signals over the L and C bands as an input and output a multi-wavelength downstream optical data signal comprising the twenty-four corresponding second optical data signals onto a fiber. More specifically, DWDM 502 may multiplex the twenty-four corresponding second optical data signals onto the fiber, wherein the twenty-four multiplexed corresponding second optical data signals compose the multi-wavelength downstream optical data signal. The multi-wavelength downstream optical data signal may have a wavelength comprising the twenty-four wavelengths of the twenty-four corresponding second optical data signals.

In some embodiments, the multi-wavelength downstream optical data signal, may be input to a circulator (e.g. circulator 504). The circulator 504 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 504 may enable the use of the same wavelength for both downstream and upstream and upstream purposes. Circulators may be one directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. circulator 504 may be round baud single or dual stage circulator that receives the downstream optical signal from the DWDM 502 and outputs a corresponding downstream optical signal to DCM 508. In some embodiments, the circulators 504 and 506 may be replaced by WDMs as well (including any other circulators described herein).

After being output by the circulator 504, the downstream optical data signal may be input into DCM 508 to compensate for dispersion that downstream optical data signal may experience. In some embodiments, DCM 508 may be configured to balance positive and/or negative dispersion that may be introduced to the egress optical data signal by the fiber. In some embodiments, DCM 508 may be configured to compensate for positive (temporal broadening of the egress optical data signal) and/or negative (temporal contraction of the egress optical data signal) dispersion introduced by fiber that is 60 km or greater in length, to reduce the sensitivity or OSNR levels of a transceiver in a DWDM located at a field hub or outside plant. More specifically, DCM 508 may be configured to reduce the sensitivity or OSNR level requirement in a photodetector or fiber-optic sensor in the transceiver, which may drastically reduce the cost of the transceivers used in the DWDM located at the field hub or outside plant. Additionally, the DCM 508 may also be tunable. That is, the DCMs can be tuned based on the transmission distance of a signal. For example, if a signal is being transmitted over a 60 km fiber, the tunable DCM may be tuned differently than if the signal were being transmitted over a 5 km fiber. The tunable DCM may be a Fiber Bragg Grating (FBG) type DCM previously described. Submitting the tunable DCM (for example, the FBG) to a temperature gradient may allow a grating chirp to be changed and, accordingly, the dispersion level of the tunable DCM to be tuned. Seven single gratings can be used for producing negative dispersion over a typical range from −800 to −2000 ps/nm or for producing a similar positive dispersion range. This means that the fiber link can be totally managed for dispersion for all distances which may range from 5 km to 60 km, or even greater distances.

In some embodiments, DCM 508 output the downstream optical data signal to WDM 516. WDM 516 may include a portion of a sub circuit that may be used to separate C band signals and L band signals for transmission. For example, the WDM 516 may separate the signals into C band signals and L band signals, may output the C band signals to amplifier 524, and may output the L band signals to amplifier 526. That is, the C band signals and L band signals may be amplified separately. The amplifier 524 and amplifier 526, as well as any other amplifiers described herein, may allow operation over a full transmission spectrum, which may include at least 48 transmission channels. That is, the amplifier 524 and amplifier 526 may be wide-band amplifiers. To support 48 channels, the amplifier 524 and amplifier 526 may optimize gain flatness and noise for the broader channel range (for example, 40 channels included with some of the other OCML systems described herein to 48 channels in OCML 501). A gain of the amplifier 524 and amplifier 526 may be based at least in part on a distance that a downstream signal has to travel. For example, the gain may be a function of a fiber attenuation coefficient α, which is a measure of the intensity of the attenuation of a beam of light as it traverses a length of an optical fiber segment. The unit of measurement of the fiber attenuation coefficient is decibels (dB) per km (dB/km). For instance, the gain of booster amplifier 524 and amplifier 526 may be adjusted based at least in part on the attenuation coefficient and length of fiber that the egress optical data signal will travel. More specifically, in some instances, the gain of booster optical amplifier 524 may be $G = e^{(2\alpha L)}$, where a is the fiber attenuation coefficient, as explained above, and L is the length of the fiber (for example, the length of primary fiber 576 and/or the length of secondary fiber 574). The downstream optical data signals received from the WDM 516 may be amplifier by amplifier 524 and amplifier 526 and may be outputted to WDM 518. The WDM 518 may combine the C and L band signals. The WDM 518 may then output the amplified downstream optical data signals to variable optical attenuator (VOA) 514.

In some embodiments, VOA 514 may receive the amplified downstream optical data signals as an input, and may be used to reduce the power levels of the downstream optical data signals. The power reduction may done by absorption, reflection, diffusion, scattering, deflection, diffraction, and dispersion, of the amplified downstream optical data signals. VOA 514 may have a working wavelength range in which it absorbs all light energy equally. In some embodiments, VOA 514 may utilize a length of high-loss optical fiber, that operates upon its input optical signal power level in such a way that its output signal power level is less than the input level. The variability of the output power level of VOA 514 may be achieved using a fiber coupler, where some of the power is not sent to the port that outputs, but to another port. Another possibility may be to exploit variable coupling losses, which are influenced by variable positioning of a fiber end. For example, the transverse position of the output fiber or the width of an air gap between two fibers may be varied, obtaining a variable loss without a strong wavelength dependence. This principle may be used for single-mode fibers. VOA 514 may be based on some piece of doped fiber, exhibiting absorption within a certain wavelength range. The VOA 514 may also be tuned in synchronization with any of the tunable DCMs (for example, DCM 508). That is the tunable DCMs and the VOA 514 may be tuned for the same transmission distance. The VOA 514 may output the amplified downstream optical data signals to circulator 506.

In some embodiments, circulator 506 may be similar to circulator 504. That is, the circulator 509 may allow additional optical wavelengths to be utilized (for example, the full array of wavelengths included in the 48 total channels) and may enable technologies such as Quasi-Coherent and PAM4 (where the DS and UP wavelengths may be closer together) to be transported in an OCML-MDM infrastructure. The circulator 506 may enable the use of the same wavelength for both downstream and upstream and upstream purposes. Circulators may be one directional, non-reciprocating (any changes in the properties of the light caused by passing through the device may not be reversed by traveling in the opposite direction) devices. Circulators can be used to separate optical signals that travel in opposite directions in one single fiber. Fiber Circulators have high isolation and low insertion loss. The circulator 506 may output the amplified downstream optical data signals received from the VOA 514 to coexistence element filter 532.

In some embodiments, the coexistence element filter 532 may receive the amplified downstream optical data signals received from the VOA 514, and may also receive signals from the one or more PON connectors 524. The coexistence element filter 532 may be a WDM element that may be used to combine all of these received signals and output one or more of the combined signals on a common output port. The coexistence element filter 532 may allow for different types of data signals to be transmitted on a single network. The coexistence element filter 532 may enable the addition of all the various types of PON signals mentioned in the application to be added to the Ethernet C and L band signals so that all the combined signals can be transported on the pair of two output ports and received by a field MDM. Examples of the coexistence element filter 532 may be provided in FIGS. 4A-4C. The coexistence element filter 532 may output one or more optical data signals to optical switch 534.

In some embodiments, the optical switch 534 may output the one or more optical data signals received from the coexistence element filter 532 to a primary fiber 576 and/or a secondary fiber 574 as well as any number of additional fibers not depicted in the figure). Also included on the primary fiber 576 and/or the secondary fiber 574 may be one or more test points (for example, test points 580 and 582 corresponding with primary fiber 576 and test points 584 and 586 corresponding with secondary fiber 574) and/or one or more Optical Time Domain Reflectometry (OTDR) ports (for example, OTDR ports 588 and/or 590). The test points may be used for monitoring downstream and upstream signals being transmitted over the primary fiber 576 and/or secondary fiber 574. The OTDR ports may allow for continuous monitoring of fibers in the presence of data for fiber degradation or fiber cuts. If a fiber cut happens, the OTDR may enable the location to be determined immediately, significantly reducing outages. OTDR functionality may be enabled via a WDM (for example, WDM 594 and/or WDM 596) and an external port (for example, the OTDR ports 588 and/or 590) on the OCML 501 for injecting an OTDR signal (which may be, for example, 1625 or 1650 nm). The WDMs may be located after the optical switch 516 so the OTDR monitoring is independent of which link is carrying downstream traffic. Both the links may always have upstream traffic present, (for example, an MDM 550 may incorporate a 50% splitter which splits the upstream signal evenly between the primary and secondary fiber). The OCML's OTDR injection ports may be specified with a degree of required isolation between the OTDR's 1625/1650 nm and traffic bearing C-band wavelengths. This traffic could be 10G or Coherent 100G/200G, for example. The additional insertion loss associated with the components required to inject the OTDR pulse and to protect transmit/receive equipment from the backscattered or transmitted OTDR signals. The additional insertion losses may be ≤0.5 dB and thus can be easily accommodated within the system link budget.

In some embodiments, the optical data signals output to the primary fiber 576 and/or secondary fiber 574 may be transmitted to the MDM 550. The optical data signals may then be received at optical splitter 551 as an ingress optical data signal. Optical splitter 551 may also be referred to as a beam splitter, and may comprise one or more quartz substrates of an integrated waveguide optical power distribution device. However, optical splitter 551 may also be any other type of optical splitter as well. Optical splitter 551 may be a passive optical network device. It may be an optical fiber tandem device comprising one or more input terminals and one or more output terminals. Optical splitter 551 may be Fused Biconical Taper (FBT) splitter or Planar Lightwave Circuit (PLC) splitter. Optical splitter 551 may be a balanced splitter wherein optical splitter 551 comprises 2 input fibers and one or more output fibers over which the ingress optical data signal may be spread proportionally. In some embodiments, the ingress optical data signal may not be spread proportionally across the output fibers of optical splitter 551. In some embodiments, optical splitter 551 may comprise 2 input fibers and 2 output fibers. A first input fiber of optical splitter 551 may be connected to primary fiber 576 and a second input fiber of optical splitter 551 may be connected to secondary fiber 574.

A first output fiber of optical splitter 551 may be connected to a coexistence filter element 552. The coexistence filter element 552 may be similar to coexistence filter element 532, coexistence filter element 532, or any other coexistence filter element described herein. A second output fiber of optical splitter 551 may be connected to a DWDM 553. Because the downstream optical data signals may be multi-wavelength downstream optical data signal, DWDM 553 may demultiplex the downstream optical data signals into individual optical data signals in accordance with the individual wavelengths of the one or more downstream optical data signals. More specifically, the one or more downstream optical data signals may be demultiplexed into twenty-four optical data signals (or any other number of optical data signals), each of which may have a unique wavelength. DWDM 553 may output each of the twenty-four optical data signals to each of the downstream transponders 554. Each of the transponders may be in a RPD (not shown) and may convert a received corresponding optical data signal, of the optical data signals, into a corresponding electrical signal. More specifically, a first transceiver in each of the downstream transponders 554 may convert each of the twenty-four optical data signals into the corresponding electrical signal. Each of the downstream transponders 554 may also comprise a second transceiver that may convert the corresponding electrical signal into a SONET/SDH optical data signal with a corresponding SONET/SDH optical data signal wavelength. In some embodiments, each of the twenty-four corresponding SONET/SDH optical data signals may have the same wavelength. In other embodiments, each of the twenty-four corresponding SONET/SDH optical data signals may have unique wavelengths.

The operation of MDM 553 may be further described by way of the processing of an upstream optical data signal transmitted to headend 501. Each of the upstream transponders 555 of the DWDM 553 may receive a SONET/SDH optical data signal and may convert the SONET/SDH optical data signal into an electrical signal. Each of the upstream transponders 555 may receive the SONET/SDH optical data signal from the RPD. The RPD may also convert one or more electrical signals into the SONET/SDH optical data signal.

More specifically, a first transceiver in the upstream transponders 555 may convert the SONET/SDH optical data signal into an electrical signal. A second transceiver may then convert the electrical signal into a second optical data signal, wherein the second optical data signal comprises one or more packets of light each of which may have a distinct wavelength. Because the one or more packets of light each have a distinct wavelength, the second optical data signal may be said to have this distinct wavelength. Thus, the twenty-four upstream transponders 555 may each receive a SONET/SDH optical data signal, and each of the twenty-four upstream transponders 555 may convert the received SONET/SDH optical data signal into a corresponding second optical data signal, wherein each of the corresponding second optical data signals has a unique wavelength. That is, the wavelength of each of the corresponding second optical data signals may be distinguishable from the wavelength of any of the other corresponding second optical data signals. Thus upstream transponders 555 may generate twenty-four corresponding second optical data signals each of which has a unique wavelength.

DWDM 553 may receive twenty corresponding second optical data signals as an input and output a multi-wavelength upstream optical data signal comprising the twenty-four corresponding second optical data signals. More specifically, DWDM 553 may multiplex the twenty-four corresponding second optical data signals onto the fiber connecting DWDM 553 and optical splitter 551, wherein the twenty multiplexed corresponding second optical data signals compose the multi-wavelength downstream optical data signal. The multi-wavelength optical data signal may have a wavelength comprising the twenty-four wavelengths of the twenty-four corresponding second optical data signals. Additionally, coexistence filter element 552 may receive one or more upstream signals as well (such as, for example, GPON, 25G/50G-PON, XG-PON1, NG-PON2, or any other type of signal). These signals may also be outputted by the coexistence filter element 552 to the optical splitter 551. Optical splitter 551 may receive one or more upstream PON signals from the coexistence filter element 552, and may also receive the multi-wavelength upstream optical data signal from the DWDM 553. Optical splitter 551 may output an egress optical data signal, which may be a multi-wavelength optical data signal. Optical splitter 551 may output the egress optical data signal onto primary fiber 535 or secondary fiber 536 connecting the optical splitter 551 to the OCML 501.

Figure 5B:
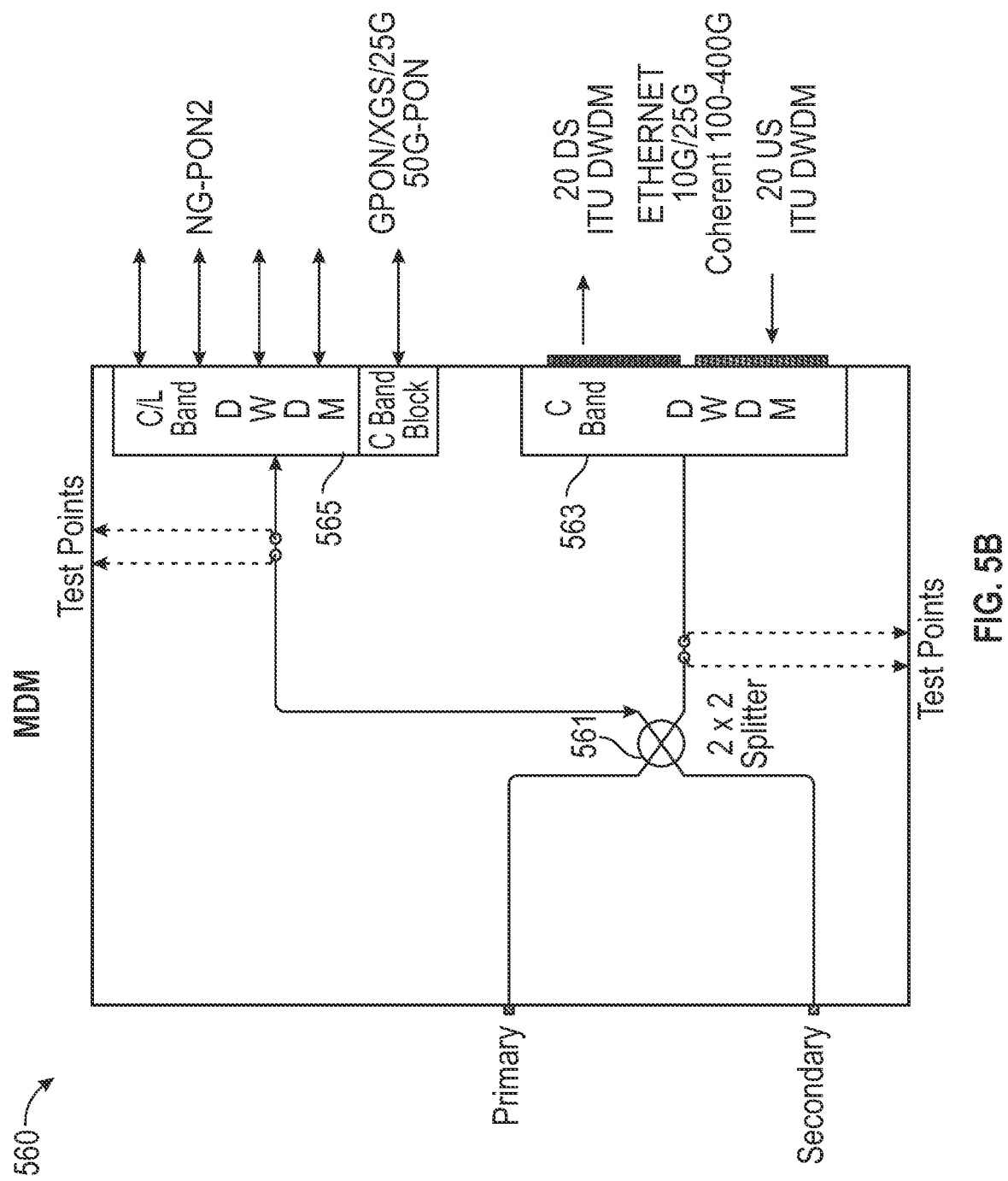
FIG. 5B depicts an example multiplexer-demultiplexer (MDM), in accordance with the disclosure.

In some embodiments, FIG. 5B depicts another example embodiments of a MDM 560. The MDM 560 may be used in place of MDM 550 or any other MDM described herein. MDM 560 may include similar elements as MDM 550. For example, optical splitter 561 may be similar to optical splitter 551 or 551 and/or DWDM 163 may be similar to DWDM 153 and/or DWDM 553. However, the MDM 160 may differ from MDM 150 and MDM 550 in that MDM 160 may include a second DWDM 565. Including the second DWDM 565 may allow for a NG-PON2 DWDM passive to the MDM to be added, so that an external DWDM would not be required to separate the NG-PON2 downstream and upstream wavelengths. Incorporating the DWDM 565 into the MDM 560 reduces the overall loss budget and helps with longer distance signal transmissions.

Returning to FIG. 5A, the operation of OCML 501 may also be described by way of the processing of upstream optical data signals received at OCML 501 from a field hub or outside plant. That is, processing in the opposite signal flow direction as downstream signal processing described above. In some instances, the processing of upstream optical data signals may involve the reverse process of the processing of downstream optical data signals as described above. That is, the processing may occur starting from the primary fiber 576 and/or secondary fiber 574 and end with the DWDM 502. In some instances, one difference between upstream and downstream processing may be that WDM 520, WDM 522, amplifier 528, amplifier 530, VOA 512, and DCM 510 may be used. Additionally, the functionality of the components involved in the upstream processing may be the same or similar to the functionality of the components involved in the downstream processing.

In processing of upstream optical data signals, a multi-wavelength ingress optical data signal, comprising one or more of a 10-400 GbE optical data signal, XGPON/10GE-PON optical data signal, and/or GPON optical data signal (as well as any other data signal), may be an upstream optical data signal received on primary fiber 576 or secondary fiber 574 depending on the position of switch 534. The multi-wavelength ingress optical data signal may be received by coexistence filter element 532. The Coexistence filter element 532 may demultiplex one or more 10-400 GbE optical data signals, XGPON/10GEPON optical data signals, and/or GPON optical data signals (as well as any other type of signal) from ingress optical data signal. Coexistence filter element 532 may transmit the one or more PON signals (for example, GPON, 25G/50G-PON, XG-PON1, NP-PON2, as well as any other types of PON signals) to PON connectors 525. Coexistence filter element 532 may transmit the one or more 10-400 GbE optical data signals to circulator 506. The operation of the circulator 509 in upstream signal transmission may be the same as during downstream signal transmission. From circulator 506, the signal may be transmitted to WDM 522. Similarly to WDM 516 in the downstream direction, WDM 522 may be used to separate C band signals and L band signals. C band signals may be provided to optical pre-amplifier 528, and L band signals may be provided to optical pre-amplifier 530, or vice versa. The optical pre-amplifier 528 and optical pre-amplifier 530 may then provide amplified signals to the WDM 520. WDM 520 may then provide the amplified signals to VOA 512, which may function similarly to VOA 514 in the downstream direction. VOA 514 may then provide the amplified signals to DCM 510.

In some embodiments, DCM 510 may be configured to balance positive and/or negative dispersion that may be introduced to a SONET/SDH egress optical data signal that may exit OCML 501 from upstream transponders 588. The SONET/SDH egress optical data signal may be an upstream signal from a field hub or outside plant destined for a MTC. For example, a customer premise may be connected to the field hub or outside plant and may send one or more packets via a SONET/SDH network to the field hub or outside plant which may in turn transmit the one or more packets using 10-400 GbE optical data signals to OCML 501. The one or more packets may be destined for a company web server connected to the MTC via a backbone network. Because OCML 501 may be collocated in a STC that is connected to the MTC via an optical ring network, wherein the connection between the STC and MTC is an SONET/SDH optical network connection, DCM 510 may be configured to compensate for positive and/or negative dispersion on the SONET/SDH optical network connection. That is DCM 510 may be configured to reduce temporal broadening of the SONET/SDH ingress optical data signal or temporal contraction of the SONET/SDH ingress optical data signal.

In some embodiments, circulator 504 may receive the optical data signals from the DCM 510 and may provide the optical data signals to DWDM 502. DWDM 502 may demultiplex one or more 10-400 GbE optical data signals. Because the optical data signals received from the circulator 504 may be a dispersion compensated amplified version of the multi-wavelength ingress optical data signal, DWDM 502 may demultiplex the one or more optical data signals into individual optical data signals in accordance with the individual wavelengths of any 10-400 GbE optical data signals in the multi-wavelength ingress optical data signal. More specifically, the optical data signals received from the circulator 504 may be demultiplexed into twenty-four 10-400 GbE optical data signals, each of which may have a unique wavelength. DWDM 502 may output each of the twenty 10-400 GbE optical data signals to each of the transponders of upstream transponders 588. Each of the transponders of upstream transponders 588 may convert a received corresponding 10-400 GbE optical data signal, of the 10-400 GbE optical data signals, into a corresponding electrical signal. More specifically, a first transceiver in each of the transponders may convert each of the twenty-four 10-400 GbE optical data signals into the corresponding electrical signal. Each of the transponders may also comprise a second transceiver that may convert the corresponding electrical signal into a SONET/SDH optical data signal with a corresponding SONET/SDH optical data signal wavelength. In some embodiments, each of the twenty-four corresponding SONET/SDH optical data signals may have the same wavelength. In other embodiments, each of the twenty-four corresponding SONET/SDH optical data signals may have unique wavelengths. The twenty-four transponders of upstream transponders 588 may transmit the twenty-four SONET/SDH optical data signals to the MTC on the SONET/SDH optical network connection. It should be noted that while 10-400 GbE optical data signals are described above, this is merely for exemplary purposes, and any other type of signal may be used as well.

FIG. 6 depicts an example system 600 architecture of an OCML headend 601 according to at least one embodiment of the disclosure. OCML headend 601 may be similar to OCML 501 and may include some similar components. For example, as shown in FIG. 6, OCML headend 601 may comprise one or more DWDMs (for example, DWDM 602), one or more circulators (for example, circulator 604 and 606), one or more DCMs (for example, DCM 608 and 610) (which may be tunable DCMs), one or more VOAs (for example, VOA 612 and/or VOA 614), one or more filtering elements 632, and one or more optical switches (for example, optical switch 634) to feed a primary optical fiber (for example, Primary Fiber 635) or secondary (backup) optical fiber (for example, Secondary Fiber 636) (as well as any number of additional fibers). The headend 601 may differ from the OCML 501 in that the OCML headend 601 may include optical amplifier 624 and optical amplifier 628 instead of including four WDMs and four optical amplifiers used to separate C and L band signals. The OCML headend 601 configuration depicted in FIG. 6 may be used when only one of the C or L band is used for downstream data transmissions and the other band is used for upstream data transmissions (for example, the C band could be used exclusively for downstream transmission and the L band cold be used exclusively for upstream transmissions, or vice versa). The OCML headend 601 configuration depicted in FIG. 6 may also be used when only one of the C or L band is used for both downstream and upstream transmissions. For example, a portion of the C band could be used for downstream transmissions and a portion of the C band could be used for upstream transmissions (the same may apply to only using the L band instead of the C band). Given that only one of the L band or C band is used for downstream and/or upstream transmissions, the OCML headend 601 may only require one amplifier 624 in the downstream direction and one amplifier 628 in the upstream direction. This may be because signals in only one band may need amplification in the OCML headend 601 instead of amplifying both C and L band signals in the OCML 501. The OCML headend 601 may also differ from OCML 501 in instances where only one of the C band or L band is used for both downstream and upstream transmissions. The OCML headend 201 may differ in these instances in that DWDM 602 may include twenty-four downstream transponders 690 and twenty-four upstream transponders 688 (however, any other number of downstream and/or upstream transponders may be used in OCML headend 601 as well).

Figure 8A:
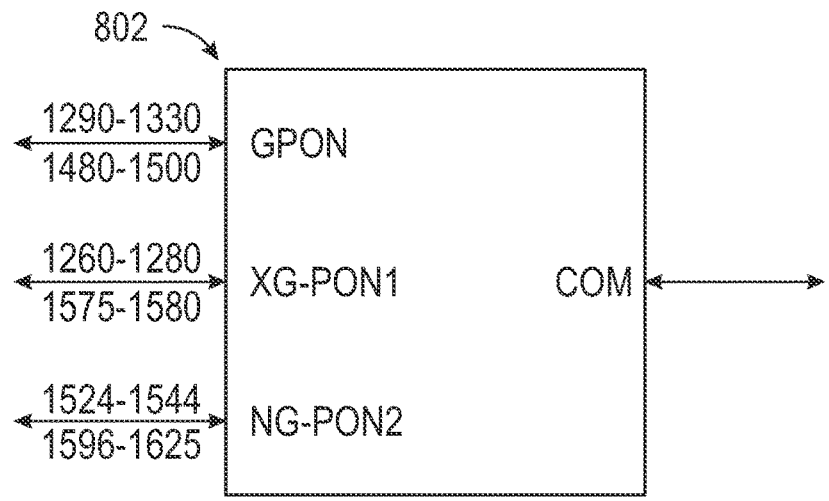
FIGS. 8A-8C depict example embodiments of a filtering component of the OCML, in accordance with the disclosure.
Figure 8B:
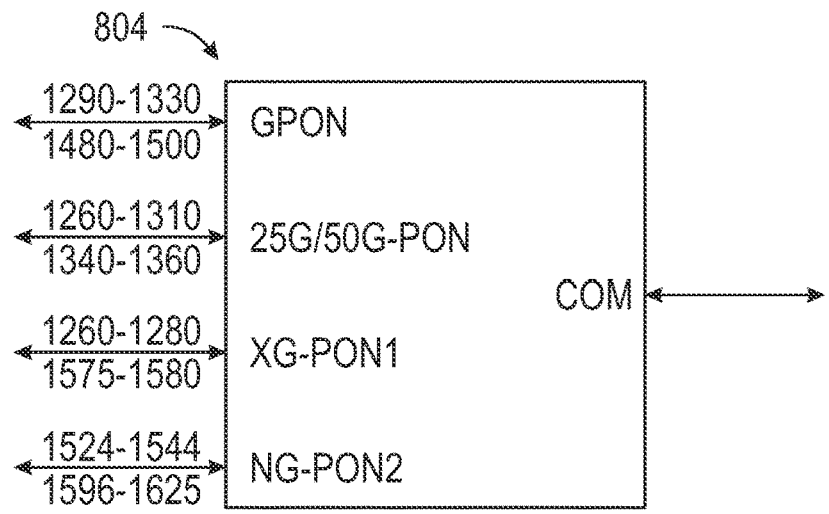
Figure 8C:
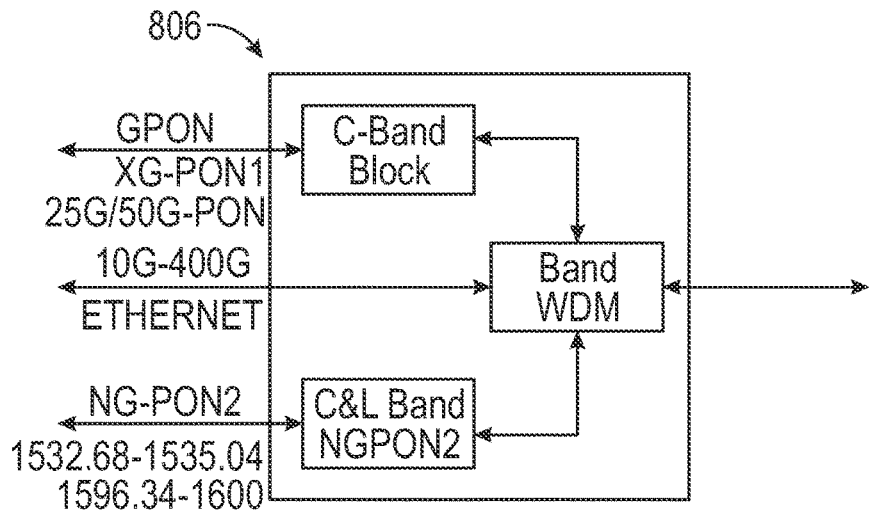

FIGS. 8A-8C depict example embodiments of a filtering component of the OCML (for example, coexistence filtering element 532 or coexistence filtering element 632), in accordance with the disclosure. FIG. 8A may depict a first example embodiment of the filtering element 802. The filtering element 802 may receive as inputs various signal types (for example, GPON, XG-PON1, and/or NG-PON2 signals) and may output the signals on a common port. The signal inputs may be filtered so that only signals in the desired wavelength ranges for the individual signal types may be passed through the filtering element 802. For example, the filtering element 802 may allow wavelengths in the range of 1290-1300 nm and 1480-1500 nm to pass through for GPON signals, wavelengths in the range of 1260-1280 nm and 1575-1580 nm to pass through for XG-PON1 signals, and wavelengths in the range of 1524-1544 nm and 1596-1625 nm to pass through for NG-PON2 signals. FIG. 8B may depict a second example embodiment of a filtering element 804. The filtering element 804 may be similar to filtering element 804, but may also include 25G/50G-PON signals as inputs to be filtered by the filtering element 804 as well. FIG. 8C may depict a third example embodiment of a filtering element 806. The filtering element 806 may differ from the filtering element 802 and/or filtering element 804 in that filtering element 806 may include a C-band wavelength filter for GPON, XG-PON1, and/or 25G/50G-PON signal inputs.

Figure 9:
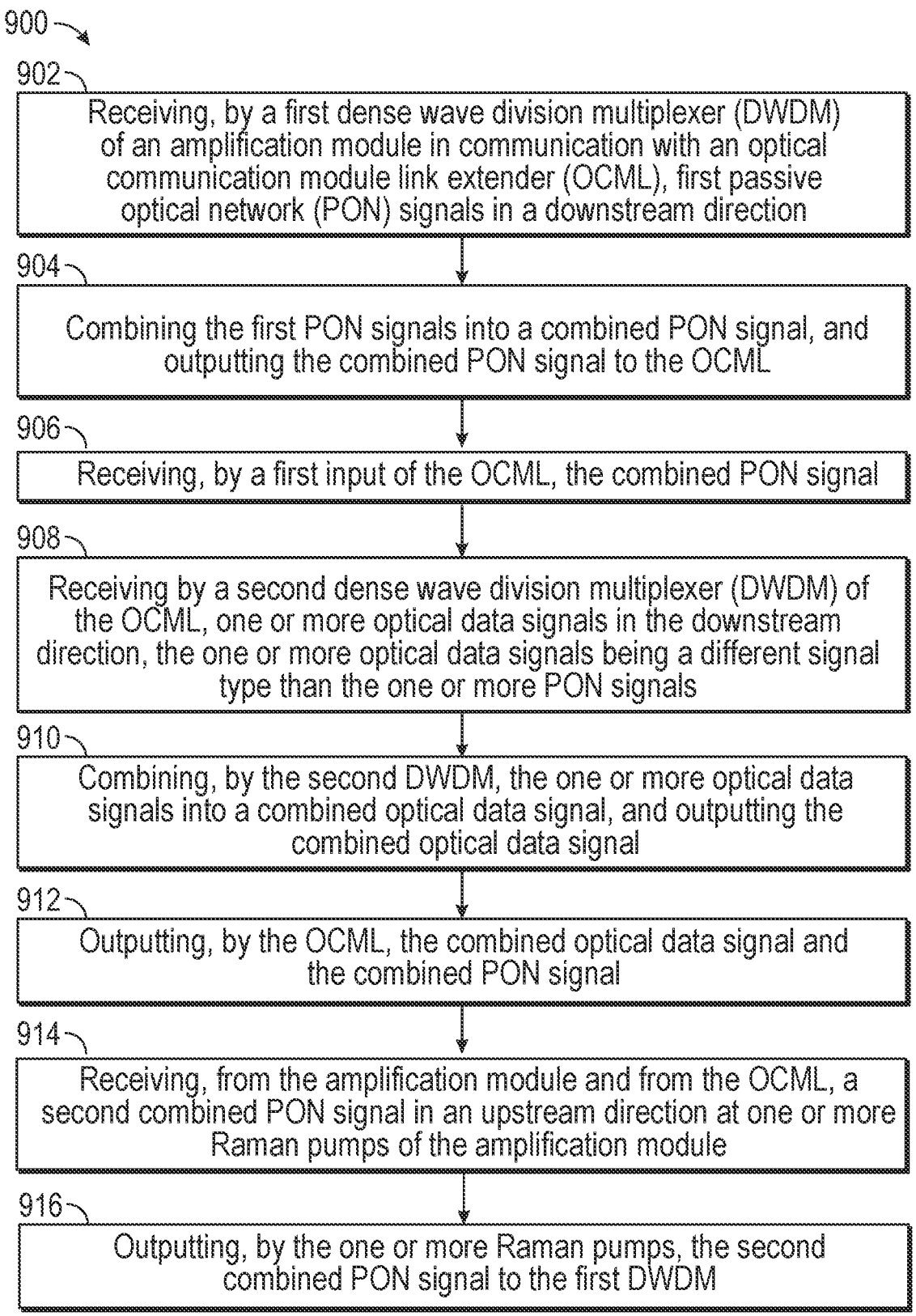
FIG. 9 depicts an example method, in accordance with the disclosure.

FIG. 9 is an example method 900. At block 902 of the method 900 in FIG. 9, the method may include receiving, by a first dense wave division multiplexer (DWDM) of an amplification module in communication with an optical communication module link extender (OCML), first passive optical network (PON) signals in a downstream direction. Block 904 of the method may include combining the first PON signals into a combined PON signal, and outputting the combined PON signal to the OCML. Block 906 of the method may include receiving, by a first input of the OCML, the combined PON signal. Block 908 of the method may include receiving by a second dense wave division multiplexer (DWDM) of the OCML, one or more optical data signals in the downstream direction, the one or more optical data signals being a different signal type than the one or more PON signals. Block 910 of the method may include combining, by the second DWDM, the one or more optical data signals into a combined optical data signal, and outputting the combined optical data signal. Block 912 of the method may include outputting, by the OCML, the combined optical data signal and the combined PON signal. Block 914 of the method may include receiving, from the amplification module and from the OCML, a second combined PON signal in an upstream direction at one or more Raman pumps of the amplification module. Block 916 of the method may include outputting, by the one or more Raman pumps, the second combined PON signal to the first DWDM.

In some embodiments, the method 900 may also include receiving, by a first dispersion compensation module (DCM) of the amplification module, the combined PON signal from the first DWDM. The method 900 may also include outputting, by the first DCM, the combined PON signal to a first wavelength-division multiplexing (WDM) module of the amplification module in the downstream direction. The method 900 may also include receiving, by a first variable optical amplifier (VOA) of the amplification module, the combined PON signal from the first amplifier in the downstream direction. The method 900 may also include receiving, by a first variable optical amplifier (VOA) of the amplification module, the combined PON signal from the first amplifier in the downstream direction. The method 900 may also include receiving, by a second WDM of the amplification module, the combined PON signal from the first VOA in the downstream direction. The method 900 may also include receiving, by a second DWDM of the amplification module, the combined PON signal. The method 900 may also include demultiplexing the combined optical data signal into one or more output PON signals. The method 900 may also include outputting the one or more output PON signals to the one or more OCMLs in the downstream direction. The method 900 may also include outputting, by the optical switch, the egress optical data signal on a secondary fiber based at least in part on an impairment to the primary fiber.

Figure 10:
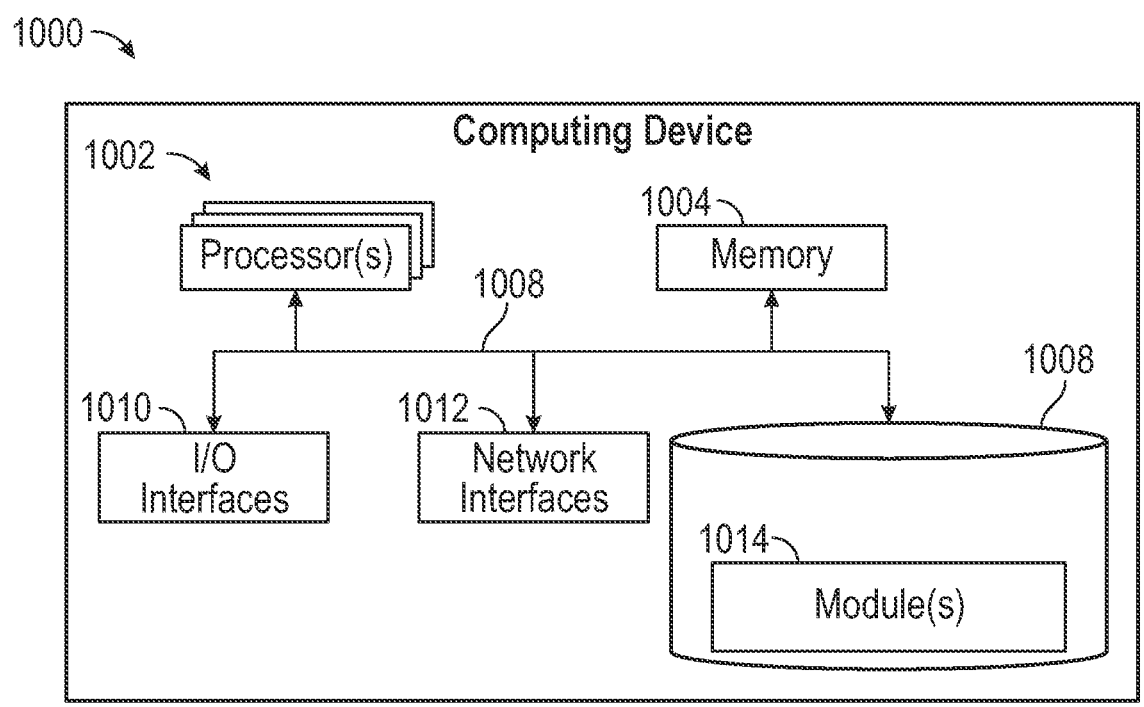
FIG. 10 depicts an example computing system, in accordance with the disclosure.

FIG. 10 illustrates an example computing device 1000, in accordance with one or more embodiments of this disclosure. The computing device 1000 may be representative of any devices described herein that may perform any active processing operations (for example, any of the modules, such as the amplification module 101, amplification module 201, amplification module 301, as well as any other module and/or any other device or system). The computing device 1000 may include at least one processor 1002 that executes instructions that are stored in one or more memory devices (referred to as memory 1004). The instructions can be, for instance, instructions for implementing functionality described as being carried out by one or more modules and systems disclosed above or instructions for implementing one or more of the methods disclosed above. The processor(s) 1002 can be embodied in, for example, a CPU, multiple CPUs, a GPU, multiple GPUs, a TPU, multiple TPUs, a multi-core processor, a combination thereof, and the like. In some embodiments, the processor(s) 1002 can be arranged in a single processing device. In other embodiments, the processor(s) 1002 can be distributed across two or more processing devices (for example, multiple CPUs; multiple GPUs; a combination thereof; or the like). A processor can be implemented as a combination of processing circuitry or computing processing units (such as CPUs, GPUs, or a combination of both). Therefore, for the sake of illustration, a processor can refer to a single-core processor; a single processor with software multithread execution capability; a multi-core processor; a multi-core processor with software multithread execution capability; a multi-core processor with hardware multithread technology; a parallel processing (or computing) platform; and parallel computing platforms with distributed shared memory. Additionally, or as another example, a processor can refer to an integrated circuit (IC), an ASIC, a digital signal processor (DSP), an FPGA, a PLC, a complex programmable logic device (CPLD), a discrete gate or transistor logic, discrete hardware components, or any combination thereof designed or otherwise configured (for example, manufactured) to perform the functions described herein.

The processor(s) 1002 can access the memory 1004 by means of a communication architecture 1006 (for example, a system bus). The communication architecture 1006 may be suitable for the particular arrangement (localized or distributed) and type of the processor(s) 1002. In some embodiments, the communication architecture 1006 can include one or many bus architectures, such as a memory bus or a memory controller; a peripheral bus; an accelerated graphics port; a processor or local bus; a combination thereof, or the like. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnect (PCI) bus, a PCI-Express bus, a Personal Computer Memory Card International Association (PCMCIA) bus, a Universal Serial Bus (USB), and/or the like.

Memory components or memory devices disclosed herein can be embodied in either volatile memory or non-volatile memory or can include both volatile and non-volatile memory. In addition, the memory components or memory devices can be removable or non-removable, and/or internal or external to a computing device or component. Examples of various types of non-transitory storage media can include hard-disc drives, zip drives, CD-ROMs, digital versatile disks (DVDs) or other optical storage, magnetic cassettes, magnetic tape, magnetic disk storage or other magnetic storage devices, flash memory cards or other types of memory cards, cartridges, or any other non-transitory media suitable to retain the desired information and which can be accessed by a computing device.

As an illustration, non-volatile memory can include read-only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory devices or memories of the operational or computational environments described herein are intended to include one or more of these and/or any other suitable types of memory.

In addition to storing executable instructions, the memory 1004 also can retain data. Each computing device 1000 also can include mass storage 1008 that is accessible by the processor(s) 1002 by means of the communication architecture 1006. The mass storage 1008 can include machine-accessible instructions (for example, computer-readable instructions and/or computer-executable instructions). In some embodiments, the machine-accessible instructions may be encoded in the mass storage 1008 and can be arranged in components that can be built (for example, linked and compiled) and retained in computer-executable form in the mass storage 1008 or in one or more other machine-accessible non-transitory storage media included in the computing device 1000. Such components can embody, or can constitute, one or many of the various modules disclosed herein. Execution of the modules, individually or in combination, by at least one of the processor(s) 1002, can cause the computing device 1000 to perform any of the operations described herein.

Each computing device 1000 also can include one or more input/output interface devices 1010 (referred to as I/O interface 1010) that can permit or otherwise facilitate external devices to communicate with the computing device 1000. For instance, the I/O interface 1010 may be used to receive and send data and/or instructions from and to an external computing device.

The computing device 1000 also includes one or more network interface devices 1012 (referred to as network interface(s) 1012) that can permit or otherwise facilitate functionally coupling the computing device 1000 with one or more external devices. Functionally coupling the computing device 1000 to an external device can include establishing a wireline connection or a wireless connection between the computing device 1000 and the external device. The network interface devices 1012 can include one or many antennas and a communication processing device that can permit wireless communication between the computing device 1000 and another external device. For example, between a vehicle and a smart infrastructure system, between two smart infrastructure systems, etc. Such a communication processing device can process data according to defined protocols of one or several radio technologies. The radio technologies can include, for example, 3G, Long Term Evolution (LTE), LTE-Advanced, 5G, IEEE 802.11, IEEE 802.16, Bluetooth, ZigBee, near-field communication (NFC), and the like. The communication processing device can also process data according to other protocols as well, such as vehicle-to-infrastructure (V2I) communications, vehicle-to-vehicle (V2V) communications, and the like. The network interface(s) 1012 may also be used to facilitate peer-to-peer ad-hoc network connections as described herein.

As used in this application, the terms "environment," "system," "unit," "module," "architecture," "interface," "component," and the like refer to a computer-related entity or an entity related to an operational apparatus with one or more defined functionalities. The terms "environment," "system," "module," "component," "architecture," "interface," and "unit," can be utilized interchangeably and can be generically referred to functional elements. Such entities may be either hardware, a combination of hardware and software, software, or software in execution. As an example, a module can be embodied in a process running on a processor, a processor, an object, an executable portion of software, a thread of execution, a program, and/or a computing device. As another example, both a software application executing on a computing device and the computing device can embody a module. As yet another example, one or more modules may reside within a process and/or thread of execution. A module may be localized on one computing device or distributed between two or more computing devices. As is disclosed herein, a module can execute from various computer-readable non-transitory storage media having various data structures stored thereon. Modules can communicate via local and/or remote processes in accordance, for example, with a signal (either analogic or digital) having one or more data packets (for example, data from one component interacting with another component in a local system, distributed system, and/or across a network such as a wide area network with other systems via the signal).

As yet another example, a module can be embodied in or can include an apparatus with a defined functionality provided by mechanical parts operated by electric or electronic circuitry that is controlled by a software application or firmware application executed by a processor. Such a processor can be internal or external to the apparatus and can execute at least part of the software or firmware application. Still, in another example, a module can be embodied in or can include an apparatus that provides defined functionality through electronic components without mechanical parts. The electronic components can include a processor to execute software or firmware that permits or otherwise facilitates, at least in part, the functionality of the electronic components.

In some embodiments, modules can communicate via local and/or remote processes in accordance, for example, with a signal (either analog or digital) having one or more data packets (for example, data from one component interacting with another component in a local system, distributed system, and/or across a network such as a wide area network with other systems via the signal). In addition, or in other embodiments, modules can communicate or otherwise be coupled via thermal, mechanical, electrical, and/or electromechanical coupling mechanisms (such as conduits, connectors, combinations thereof, or the like). An interface can include input/output (I/O) components as well as associated processors, applications, and/or other programming components.

Further, in the present specification and annexed drawings, terms such as "store," "storage," "data store," "data storage," "memory," "repository," and substantially any other information storage component relevant to the operation and functionality of a component of the disclosure, refer to memory components, entities embodied in one or several memory devices, or components forming a memory device. It is noted that the memory components or memory devices described herein embody or include non-transitory computer storage media that can be readable or otherwise accessible by a computing device. Such media can be implemented in any methods or technology for storage of information, such as machine-accessible instructions (for example, computer-readable instructions), information structures, program modules, or other information objects.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, permit the automated provision of an update for a vehicle profile package. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A system comprising:
    an amplification module in communication with one or more optical communication module link extenders (OCML), the amplification module comprising:
        a first dense wave division multiplexer (DWDM) that is configured to receive first passive optical network (PON) signals in a downstream direction, combine the first PON signals, and output a combined PON signal to the one or more OCMLs;
        one or more Raman pumps configured to receive second PON signals in an upstream direction from the one or more OCMLs and provide the second PON signals to the first DWDM; and
    the one or more optical communication module link extenders (OCMLs) comprising:
        a first input configured to receive the combined PON signal from the amplification module;
        a second dense wave division multiplexer (DWDM) that is configured to receive one or more optical data signals through a second input, combine the one or more optical data signals, and output a combined optical data signal, the one or more optical data signals being a different signal type than the first PON signals; and
        an optical switch configured to selectively output the combined optical data signal and the combined PON signal to a first fiber.

2. The system of claim 1, wherein the amplification module further comprises:
    a first dispersion compensation module (DCM) configured to receive the combined PON signal from the first DWDM and output the combined PON signal to a first wavelength-division multiplexing (WDM) module in the downstream direction.

3. The system of claim 2, wherein the amplification module further comprises:
    a second DCM configured to receive the combined PON signal from the first WDM module in the downstream direction.

4. The system of claim 3, wherein the amplification module further comprises:
    a first variable optical amplifier (VOA) configured to receive the combined PON signal from a first amplifier in the downstream direction.

5. The system of claim 4, wherein the amplification module further comprises:
    a second WDM configured to receive the combined PON signal from the first VOA in the downstream direction.

6. The system of claim 5, wherein the amplification module further comprises:
    A third DWDM that is configured to receive the combined PON signal, demultiplex the combined PON signal into one or more output PON signals, and output the one or more output PON signals to the OCML in the downstream direction.

7. The system of claim 6, wherein the amplification module further comprises a second VOA and a third DCM.

8. The system of claim 5, wherein the amplification module receives the first passive optical network (PON) signals from an OLT, and wherein the one or more Raman pumps are further configured to receive the second PON signals from the optical switch and provide the second PON signals to the second WDM.

9. The system of claim 1, wherein the optical switch is further configured to output the combined optical data signal and the combined PON signal on a second fiber based at least in part on an impairment to the first fiber.

10. The system of claim 1, wherein the amplification module is configured to amplify only PON signals.

11. The system of claim 1, wherein the amplification module is configured to receive first passive optical network (PON) signals over a C or L band.

12. The system of claim 1, wherein the amplification module further comprises an L band saturated mode EDFA in downstream direction and C band burst mode EDFA in upstream direction.

13. A method comprising:
receiving, by a first dense wave division multiplexer (DWDM) of an amplification module in communication with an optical communication module link extender (OCML), first passive optical network (PON) signals in a downstream direction;
combining the first PON signals into a combined PON signal, and outputting the combined PON signal to the OCML;
receiving, by a first input of the OCML, the combined PON signal;
receiving by a second dense wave division multiplexer (DWDM) of the OCML, one or more optical data signals in the downstream direction, the one or more optical data signals being a different signal type than the one or more PON signals;
combining, by the second DWDM, the one or more optical data signals into a combined optical data signal, and outputting the combined optical data signal;
outputting, by the OCML, the combined optical data signal and the combined PON signal;
receiving, from the amplification module and from the OCML, a second combined PON signal in an upstream direction at one or more Raman pumps of the amplification module; and
outputting, by the one or more Raman pumps, the second combined PON signal to the first DWDM.

14. The method of claim 13, further comprising:
receiving, by a first dispersion compensation module (DCM) of the amplification module, the combined PON signal from the first DWDM;
outputting, by the first DCM, the combined PON signal to a first wavelength-division multiplexing (WDM) module of the amplification module in the downstream direction; and
receiving, by a first variable optical amplifier (VOA) of the amplification module, the combined PON signal from a first amplifier in the downstream direction.

15. The method of claim 14, further comprising:
receiving, by a second WDM of the amplification module, the combined PON signal from the first VOA in the downstream direction.

16. The method of claim 15, further comprising:
receiving, by a third DWDM of the amplification module, the combined PON signal;
demultiplexing the combined optical data signal into one or more output PON signals; and
outputting the one or more output PON signals to the one or more OCMLs in the downstream direction.

17. The method of claim 16, wherein the amplification module further comprises a second VOA and a third DCM.

18. The method of claim 13, further comprising:
outputting, by an optical switch, the combined optical data signal and the combined PON signal.

19. A non-transitory computer-readable medium storing computer-executable instructions, that when executed by at least one processor, cause the at least one processor to perform operations of:
receiving, by a first dense wave division multiplexer (DWDM) of an amplification module in communication with an optical communication module link extender (OCML), first passive optical network (PON) signals in a downstream direction;
combining the first PON signals into a combined PON signal, and outputting the combined PON signal to the OCML;
receiving, by a first input of the OCML, the combined PON signal;
receiving by a second dense wave division multiplexer (DWDM) of the OCML, one or more optical data signals in the downstream direction, the one or more optical data signals being a different signal type than the one or more PON signals;
combining, by the second DWDM, the one or more optical data signals into a combined optical data signal, and outputting the combined optical data signal;
outputting, by the OCML, the combined optical data signal and the combined PON signal;
receiving, from the amplification module and from the OCML, a second combined PON signal in an upstream direction at one or more Raman pumps of the amplification module; and
outputting, by the one or more Raman pumps, the second combined PON signal to the first DWDM.

20. The non-transitory computer-readable medium of claim 19, wherein the computer-executable instructions further cause the at least one processor to perform operations of:
receiving, by a first dispersion compensation module (DCM) of the amplification module, the combined PON signal from the first DWDM;
outputting, by the first DCM, the combined PON signal to a first wavelength-division multiplexing (WDM) module of the amplification module in the downstream direction; and
receiving, by a first variable optical amplifier (VOA) of the amplification module, the combined PON signal from a first amplifier in the downstream direction.

\* \* \* \* \*